United States Patent
Nelson et al.

(10) Patent No.: US 8,017,906 B2
(45) Date of Patent: Sep. 13, 2011

(54) SLIT AND SLOT SCAN, SAR, AND COMPTON DEVICES AND SYSTEMS FOR RADIATION IMAGING

(76) Inventors: Robert Sigurd Nelson, La Mesa, CA (US); William Bert Nelson, Excelsior, MN (US)

( * ) Notice: Subject to any disclaimer, the term of this patent is extended or adjusted under 35 U.S.C. 154(b) by 0 days.

(21) Appl. No.: 12/384,459

(22) Filed: Apr. 6, 2009

(65) Prior Publication Data

US 2010/0270462 A1    Oct. 28, 2010

Related U.S. Application Data

(60) Provisional application No. 61/123,238, filed on Apr. 8, 2008.

(51) Int. Cl.
*G01D 18/00* (2006.01)
(52) U.S. Cl. .................................................. 250/252.1
(58) Field of Classification Search ......... 250/370.01–370.15, 252.1; 378/98.8
See application file for complete search history.

(56) References Cited

U.S. PATENT DOCUMENTS

| | | | |
|---|---|---|---|
| 4,560,882 A | 12/1985 | Nelson | |
| 4,937,453 A | 6/1990 | Nelson | |
| 4,958,368 A | 9/1990 | Parker | |
| 4,969,175 A | 11/1990 | Nelson | |
| 5,017,782 A | 5/1991 | Nelson | |
| 5,258,145 A | 11/1993 | Nelson | |
| 5,471,051 A * | 11/1995 | Niigaki et al. | 250/214 VT |
| 6,216,540 B1 | 4/2001 | Nelson | |
| 6,583,420 B1 | 6/2003 | Nelson | |
| 7,147,372 B2 * | 12/2006 | Nelson et al. | 378/207 |
| 7,157,014 B1 * | 1/2007 | Andreaco et al. | 216/24 |
| 7,291,841 B2 | 11/2007 | Nelson | |
| 7,339,172 B2 * | 3/2008 | Rowland et al. | 250/363.02 |
| 7,476,864 B2 * | 1/2009 | Benlloch Baviera et al. | 250/370.11 |
| 2008/0187094 A1 * | 8/2008 | Stodilka et al. | 378/22 |
| 2008/0237476 A1 * | 10/2008 | Uribe et al. | 250/363.04 |

OTHER PUBLICATIONS

Shikhaliev et al., "Scanning-slit photon counting x-ray imaging system using a microchannel plate detector," 2004, Medical Physics, vol. 31, No. 5, pp. 1061-1071.*
2004, Braem, Nuc.Inst. Method vol. 525, pp. 268-274.
2007, Braem, Nuc. Inst. Method v.580, pp. 1513-1521.
2004, Verger, IEEE Nuc. vol. 51(6), pp. 3111-3117.
Jan. 8, 2007, Nelson, Disclosure 610914, pp. 1-16, Figures.
U.S. Appl. No. 60/667,824, filed Mar. 31, 2006, Nelson.

* cited by examiner

*Primary Examiner* — David P Porta
*Assistant Examiner* — Kiho Kim

(57) ABSTRACT

The invention provides methods and apparatus for detecting radiation including x-ray photon (including gamma ray photon) and particle radiation for radiographic imaging (including conventional CT and radiation therapy portal and CT), nuclear medicine, material composition analysis, container inspection, mine detection, remediation, high energy physics, and astronomy. This invention provides novel face-on, edge-on, edge-on sub-aperture resolution (SAR), and face-on SAR scintillator detectors, designs and systems for enhanced slit and slot scan radiographic imaging suitable for medical, industrial, Homeland Security, and scientific applications. Some of these detector designs are readily extended for use as area detectors, including cross-coupled arrays, gas detectors, and Compton gamma cameras. Energy integration, photon counting, and limited energy resolution readout capabilities are described. Continuous slit and slot designs as well as sub-slit and sub-slot geometries are described, permitting the use of modular detectors.

26 Claims, 11 Drawing Sheets

SLIT AND SLOT SCAN, SAR, AND COMPTON DEVICES AND SYSTEMS FOR RADIATION IMAGING

This is a continuation of provisional application No. 61/123,238 filed on Apr. 8, 2008.

FIELD OF THE INVENTION

This invention provides novel face-on, edge-on, edge-on sub-aperture resolution (SAR), and face-on SAR scintillator and gas detectors, designs and systems for enhanced slit and slot scan area radiographic imaging and nuclear medicine imaging that are also suitable for industrial, Homeland Security, and scientific imaging applications.

BACKGROUND OF THE INVENTION

The dominant x-ray radiographic imaging system formats are the large area (flat) detectors and the slit/slot scanning detectors. Large area x-ray detectors are employed (in most cases) in stationary configurations in a face-on geometry. They tend to be expensive to build due to readout response uniformity problems over large areas. Response uniformity problems also limit the thickness of the detector material (typically a scintillator or semiconductor, although gas detectors have been used for applications such as mammography) that interacts with the incident ionizing radiation. Large area x-ray detectors are often used with an anti-scatter grid which increases patient dose since a fraction of unscattered radiation used for imaging is also removed.

Slit scanning x-ray detectors are line detectors that can be implemented in an edge-on or face-on geometry in a slit scan system. Complexity is introduced by the need for a rapid readout and the need for the uniform motion of the scanning system (translation and rotation motions of the radiation source, detector, and patient are all possible). Response uniformity issues are simplified relative to large area detectors. Slit scan systems typically offer more efficient detectors than large area detectors but they are far less efficient with regard to x-ray tube output utilization. Slit widths on the order of 0.05 mm (50 um) are in use for mammography slit scanning. The first commercial CT scanners used a single slit in which the patient and table were moved through the x-ray beam. Commercial slit scans systems typically require high output x-ray tubes (synchrotron sources are not yet cost-effective). The inefficient utilization of the x-ray tube output can be ameliorated by using multiple slits or a slot (or multiple slots). One limitation of a slot versus a slit is that there is an increase in scatter detection. A slot scan detector has two or more adjacent lines of detectors. Cost is a factor in deciding to implement multiple slit or slot (or multiple slot) configurations that increase the available detector area. If the detector position remains fixed with respect to the slot then a time delay integration (TDI) readout technique is usually employed. A commercial CT scanner with multiple rows of detectors can be viewed as a particular type of slot scan system but the detectors don't operate in a TDI readout mode.

An additional issue to consider is how to treat the detected signal. Integrating the energy of the total detected signal (referred to as energy integration or integration), involves summing the signals from all events over a given period of time. It is the simplest method and widely implemented in large area detector systems and slot scan systems. Depending on the detected beam spectrum the integration approach may represent an undesirable loss of information content (Nelson, U.S. Pat. No. 4,958,368 and U.S. Pat. No. 4,969,175). An alternative approach, photon counting, involves detecting individual x-ray events. A simple photon counting technique typically employs a low signal level threshold cutoff below which events are ignored. A more-sophisticated photon counting technique implements upper and lower signal threshold cutoffs. The most sophisticated photon counting technique involves segregating events into energy bins (providing energy resolution or spectroscopy). In the past the low x-ray energies (typically less than 120 KeV max), the high x-ray event rates encountered in diagnostic medical radiography and CT, as well as a lack of fast scintillators with good conversion efficiency and fast, low-noise photodetectors and readout electronics have been a barrier to utilizing photon counting techniques for scintillator-based slit and slot scan systems. (At least one commercial slit scan system for mammography implements photon counting but it utilizes a silicon semiconductor x-ray detector.) Although photon counting techniques are more expensive to implement than simple integration, cost issues are becoming less of a barrier with the introduction of desirable scintillators, photodetectors, and sophisticated high speed readout electronics within the last few years.

Semiconductor detectors based on semiconductor materials such as Si, Ge, GaAs, CdTe, CdZnTe (CZT), HgI2, PbI2, Se, Diamond, etc. (including films of these materials) have been pursued in radiography since they may offer a low noise, direct electronic readout (the potential for photon counting with energy resolution) as well as acceptable or superior detection efficiency. Si and Ge are widely used in radiation detectors. Both are capable of reasonably fast readout speeds and excellent energy resolution. They can withstand large radiation doses before their properties deteriorate noticeably. Drawbacks may include low atomic number and density (Si) or cooling requirements (Ge is typically cooled with liquid nitrogen). Semiconductor materials may have yield issues for acceptable thicknesses, dead layers, polarization issues, or readout times for electronic signals that may be excessive for slit or slot scanning systems (including CT systems).

Scintillator detectors compete with semiconductor detectors based on cost, readout rates, and desirable material properties. The range of scintillator materials available for nuclear medicine and x-ray imaging has increased significantly since the 1980s in which scintillators such as Gd2O2S:Tb, NaI:Tl, CsI:Na, CsI:Tl, columnar CsI:Na/Tl, CaWO4, CdWO4, BaF2, and BGO played a prominent role. (Gd-based scintillators and LiI:Eu were also useful for neutron detection.) Newer scintillators (including, but not limited to GSO, LSO, LYSO, LuAP, LaBr$_3$, LaCl$_3$, GdI$_3$, LuI$_3$, SrI$_2$, BaHfO$_3$, SrHfO$_3$, PbWO$_4$, and CsI:Tl,Sm) with moderate-to-high density, desirable atomic composition, good light output, fast decays times, and reasonable indices of refraction have been developed for nuclear medicine applications such as probe detectors, gamma cameras, and PET cameras. Ceramic and nano-particle ceramic (and nanocomposite) implementations of nuclear medicine scintillators are being developed and tested. Improved ceramic scintillators are currently being used in medical CT scanners. Efficient manufacturing techniques to build structured 1-D and 2-D scintillator arrays for x-ray (including gamma ray) photon detection have been developed (Nelson, U.S. Pat. No. 5,258,145). Glass, plastic, liquid, and noble gas scintillator materials have also been used for nuclear medicine imaging of gamma rays and particles such as alphas and betas. (Particular versions of these detectors have been used in x-ray radiography as well as for neutron detection and neutron radiography.) High speed photodetector readout in a compact format has become more practical due to development of Si photodetectors such as electron multiplying CCDS (EMCCDs), Geiger-mode silicon photomultiplier (SiPM) arrays, internal discrete amplification detector (iDAD) arrays, avalanche photodiode (APD) arrays or position-sensitive APDs (PSAPDs), etc. that can provide (in some cases) readout times that range from nanoseconds to sub-nanoseconds, and can provide gain. Subgroups of these pixels can share a common output for the total energy of the signal and provide a weighted spatial location if desired (Nelson, Application No. 60/667,824). Silicon drift detectors (SDDs) are capable of low noise readout but require additional amplification. Photoemissive detector formats that offer a high-speed readout have also been developed such as 2-D position sensitive photomultiplier tubes or PSPMTs, 2-D hybrid photoemissive-photodiode arrays (Braem A., et al., Nuc. Instr. Meth. Phys. Res. A Vol. 525, pp. 268-274, 2004 and Vol. 580, pp. 1513-1521, 2007), scintillator-based intensifiers optically coupled to photodetector arrays, microchannel plate amplifiers (microchannel plates) coupled to photodetector or metal arrays, etc. In addition, the conversion efficiencies of several photocathode materials have improved such that they are competitive with silicon photodetectors for the shorter wavelengths encountered with many fast-decay scintillators.

SUMMARY OF THE INVENTION

The invention utilizes the recent improvements in scintillators and photodetectors developed for nuclear medicine, high energy physics, etc. to develop cost-effective slit and slot scan detector systems for radiology with imaging properties comparable or superior to existing slit or slot scan detector systems. Energy integration, photon counting, and limited energy resolution detection modes can now be implemented whereas the current scintillator-based slit and slot scan systems implement energy integration only. In addition, changes in detector scan geometry can be employed to reduce production and maintenance costs while promoting additional scatter reduction. Although applications discussed herein are primarily directed at x-ray photon detection (which includes gamma ray photons for the purposes of this disclosure), in principle the invention can also be used to detect charged particles (alphas, betas, protons, etc.) and neutrons (as well as other neutral particles).

The invention provides edge-on and face-on scintillator detector designs and systems for enhanced slit and slot scan radiographic imaging for medical (including radiation therapy portal and CT, conventional CT), industrial (including x-ray inspection, CT, material analysis, and home land security), and scientific imaging applications. In one aspect, the invention provides edge-on or edge-on, sub-aperture resolution (SAR) detector designs wherein scintillators in the edge-on orientation are coupled to photodetectors (readout elements) for slit and slot scan radiographic imaging. SAR encoding techniques are described in U.S. Pat. Application No. 20040251419 and Nelson, et al., U.S. Pat. No. 7,291,841 and are incorporated herein. Interaction depth measurement capabilities can provide limited energy resolution through discrete depth resolution measurements or by determining the position dependence of the optical signal by numerical methods such as optical Monte Carlo simulations or by direct position-dependent measurements (Nelson, U.S. Pat. No. 4,560,882 and Nelson, U.S. Pat. No. 4,937,453) and thus permitting corrections for optical signal losses. SAR positional information can also be used to correct estimates of the time-of-flight of the initial signal. Single or multiple material versions of this invention can be implemented. In another aspect, the invention provides face-on scintillator detector designs coupled to photodetectors (readout) for slit and slot scan radiographic imaging.

The invention provides several types of photodetector readout formats. Discrete 1-D and 2-D photodetector arrays, 2-D position-sensitive photodetectors, and segmented (strip) position-sensitive photodetectors are all suitable for edge-on and face-on scintillator detector designs as described in Application No. 60/667,824 (Nelson) and are incorporated herein. One version of a strip, position-sensitive photodetector is a strip array PSAPD detector. Strip readout geometries can also be implemented using SiPM arrays or internal discrete amplification detector (iDAD) arrays. Discrete arrays of APDS, SDDs, as well as EMCCDs, etc. can also be employed. Furthermore, SDDs can implement amplification of signals prior to digitization, including Geiger mode (as with SiPMs or iDADs), avalanche mode (as with APDs), and multiplication mode (as with EMCCDs) amplification. An alternative approach is to implement 2-D photoemissive detectors with discrete or position-sensitive readouts or their 1-D versions for the appropriate detector geometry (Nelson, U.S. Pat. No. 5,017,782). Photoemissive detectors may be preferred in some instances. For example, the photoemissive cathode response may be a better match to the emission spectrum of a specific scintillator material or it may be more cost-effective to produce a large photo-emissive surface area. Microchannel plate amplifier are but one example of a fast photoemissive detector that can be used with a scintillator array in various edge-on and face-on configurations for slit or slot scan imaging.

Slit and slot scan designs typically employ one or more slits or slots. The slit or slot length is significantly longer than the slit or slot width. The substantial length dimension often requires forming long arrays of scintillator materials (continuous or from discrete elements) that must be coupled to long photodetector arrays. Long photodetector arrays can consist of a single photodetector module but are often made by butting smaller photodetector array modules together. This adds a degree of complexity in assembling a detector system as well as in maintenance (the problem of repairing or replacing one or more dysfunctional readout elements. A similar problem exists when assembling a long photoemissive-based detector array. A single defect could require installing a new detector array and returning the old detector array to the factory. Typically, as the length dimension of the slit or slot increases (the area of the open aperture increases) the relative level of detected x-ray scatter increases. If two or more slits or slots are employed in a scanner they are offset so that they cover only part of the image during the scanning motion (avoiding scanning the same tissue volume multiple times) and reduce the overall scan time proportional to the number of slits or slots. While single- and multiple-slit or slot scanning geometries can be used with the detectors described in this invention, additional flexibility is introduced by dividing a slit or slot along the length dimension into sub-slits or sub-slots. The detector would be divided along the length dimension into detector modules to match the lengths of the sub-slits or sub-slots. A simple implementation of a scanning geometry is to have every other sub-slit or sub-slot and its corresponding detector module offset (staggered) from the original continuous slit or slot. This design would help reduce the relative level of detected x-ray scatter at each detector module. A large continuous detector can now be approximated by a set of detector modules that would be much less expensive to construction and repair (or replace). The design of focused detectors is simplified since individual modules can be optimized to compensate for local beam divergence. If the modules are sufficiently small, varying the tilt of modules according to their distance form the center of the beam is another method of compensating for beam divergence. A drawback to the offset detector geometry is that the multiple detector modules will have to be aligned with the x-ray beams. Depending on the application and the offset between sub-slits or sub-slots and their detector modules, the x-ray beams corresponding to certain detector modules may have to be blocked prior to and after exceeding, respectively, the desired scan area in order to avoid unnecessary dose to areas that need not be imaged.

The compositions, devices, detectors, designs and systems of the invention can be used with any known device, e.g., with any known imaging device, e.g., as an integral part of the device or operatively linked to the device; for example, compositions, devices, detectors, designs and systems of the invention can be used with any known x-ray imaging device, any known fluoroscopy device or system, or any known computed tomography (CT) device or system, or any known digital mammography device or system, or any known digital chest x-ray device or system, or any known bone scanning device or system, or any known nuclear medicine device or system, or any known magnetic resonance imaging (MRI) device or system, or any known ultrasound device or system, or any known optical device or system; as described, e.g., in U.S. Pat. Nos. 7,019,297; 6,996,430; 6,992,762; 6,967,331; 6,978,039; 6,943,355; 6,921,840; 6,917,826; 6,803,580; 6,794,653; 6,774,358; 6,558,333; 6,642,523; 6,429,434; 6,289,235; 6,226,543.

These and other advantages of the present invention will become apparent upon reference to the accompanying drawings and the following description.

The details of one or more embodiments of the invention are set forth in the accompanying drawings and the description below. Other features, objects, and advantages of the invention will be apparent from the description and drawings, and from the claims.

All publications, patents, patent applications, U.S. Patent Office Disclosure Documents, cited herein are hereby expressly incorporated by reference for all purposes.

DETAILED DESCRIPTION

Figure 1:
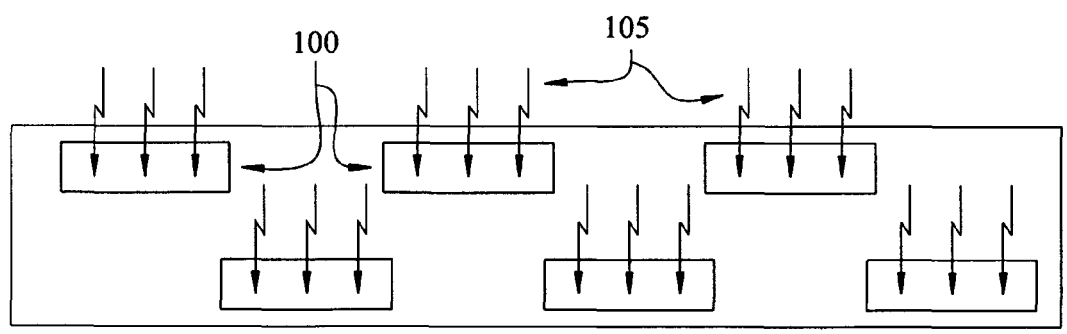
FIG. 1 illustrates a perspective view of offset scanning sub-slits or sub-slots as a replacement for a continuous slit or slot.

The invention provides edge-on and face-on scintillator detector designs and systems for enhanced slit and slot scan radiographic imaging for medical (including radiation therapy portal and CT, conventional CT), industrial, and scientific imaging applications. The scintillator-based detector for x-ray slit and slot scanning is comprised of: a scintillator x-ray detector, a photodetector coupled to the scintillator, high speed electronics for analyzing the readout signals using energy integration or photon counting techniques, and an electronic communications link to a computer for data post-processing, storage, and display. Additional aspects of the detector design include temperature control and power management as well as appropriate shielding from x-rays.

The general properties of edge-on and face-on detectors or detector modules (comprised of edge-on or face-on scintillator detectors, photodetector readout and processing electronics, focused and dynamic scanning capability, power management, communications, temperature control, and radiation shielding) are similar to those described in Nelson, U.S. Pat. No. 6,583,420 and Nelson, U.S. Pat. Application No. 20040251419, and Nelson, U.S. Patent Office Disclosure Document No. 610914. In one aspect, the invention provides edge-on or face-on scintillator detector designs coupled to photodetectors (readout elements) for slit and slot scan radiographic imaging. In another aspect, the invention provides edge-on or face-on, sub-aperture resolution (SAR) scintillator detector designs coupled to photodetectors for slit and slot scan radiographic imaging. SAR encoding techniques are described in U.S. Pat. Application No. 20040251419 and Application No. 60/667,824 (Nelson) and are incorporated herein. SAR detectors may reduce the number of readout elements required for slot scanning. Edge-on detectors with interaction depth measurement capabilities can provide limited energy resolution through discrete depth resolution measurements or by determining the position dependence of the optical signal. Single or multiple material versions can be implemented. Edge-on detector designs are in some cases more expensive to implement but they may also be less susceptible to signal dependence on the energy of the incident x-rays (face-on detectors typically have the photodetector at the opposite face from the entrance face). Edge-on designs are also useful in that the photodetector, in some cases, is removed from the direct beam path.

The invention provides several types of readout elements. Segmented readout photodetectors for edge-on and face-on scintillator detector designs are described in Application No. 60/667,824 (Nelson) and are incorporated herein. In one aspect, photodetector comprises one of: a strip array PSAPD detector, a sub-strip array PSAPD detector, a sub-area array PSAPD detector, a mixed PSAPD detector, and/or a sub-strip SDD detector. Strip readout geometries can be implemented using SiPM arrays or internal discrete amplification photodetector arrays. These segmented readout photodetectors can be incorporated into, or used with, any edge-on scintillator detector module device of the invention. Discrete arrays of APDS, SiPMs, iDADs, SDDs, etc. (as well as EMCCDs) can also be employed. Since SiPMs and related designs can be comprised of many fine micropixels (with gain) a dynamic focusing capability can be implemented where sub-arrays of micropixels are selectively readout according to a desired geometric pattern (such as a series of truncated pyramids pointing to a source of radiation). This dynamic focusing ability includes the ability to redefine the pixel spatial resolution (for example expanding or shrinking a square pixel, defining a pixel with a hexagonal shape, etc.). The focusing problem could be defined on-site rather than at the factory. This focusing capability can be used with continuous or segmented scintillators. For example focusing capability can be employed in x-ray radiography, CT, radiation therapy imaging, and nuclear medicine imaging (gamma cameras, Compton gamma cameras, probes and minigamma cameras, PET cameras). An alternative approach is to implement photoemissive detectors with discrete or position-dependent readouts. The photodetectors can be coupled to a number of bright, dense, moderate to high atomic number scintillators with good conversion efficiencies and sufficiently fast decay times to minimize scanning motion noise (image blur) and ensure high count rates. Although direct coupling between scintillator and photodetector is desirable, indirect coupling through a fiber bundle, a focused fiber bundle, a lens microarray, Selfoc lenses, Fresnel lenses, GRIN lenses, a conventional lens, wavelength shifting fibers, nanostructures (including photonic bandgap structures), etc. may also be acceptable based on the gain available from the photodetectors.

Slit and slot scan designs typically employ one or more slits or slots. Two examples are breast and chest scanning. The slit or slot lengths are significantly longer than the slit or slot width. The substantial length dimension often requires forming long arrays of scintillator materials that must be coupled to long photodetector arrays. (An alternative approach is to use semiconductor materials such as Si, GaAs, CdTe, or CZT as direct x-ray detectors. However, these detectors may have one or more weaknesses such a low density, low atomic number, limited thickness, high cost, uniformity problems, polarization and saturation issues that limit count rates, and limited lifetime due to dose-dependent performance degeneration. Low density or low atomic number semiconductor materials may permit excessive path lengths for incident x-rays as well as characteristic x-rays or Compton scattered x-rays. These effects can represent the loss of energy within a detector element or cross talk between detector elements.) Long photodetector arrays are often made by butting smaller photodetector arrays together. This adds a degree of complexity in assembling a detector system as well as in maintenance (the problem of repairing or replacing one or more dysfunctional readout elements. A similar problem exists when assembling a long photoemissive array. A single defect could require installing a new detector array and returning the old detector array to the factory. Typically, as the length dimension of the slit or slot increases (the area of the open aperture increases) the relative level of detected x-ray scatter increases. If two or more slits or slots are employed in a scanner they may be offset so that each slit or slot covers only part of the image during the scanning motion (avoiding scanning the same tissue volume multiple times). This reduces the overall scan time in proportion to the number of slits or slots. Alternatively, the slits or slots can be located closer together and the detectors can operate in TDI mode. While single- and multiple-slit or slot scanning geometries can be used with the detectors described in this invention, additional flexibility is introduced by dividing slit or slot along the length dimension into sub-slits or sub-slots. The detector would be divided along the length dimension into detector modules to match the lengths of the sub-slits or sub-slots. A simple implementation of a scanning geometry is to have every other sub-slit or sub-slot 100 and its corresponding detector module (not shown) offset (staggered) from the position of the single continuous slit or slot (FIG. 1). This design would help reduce the relative level of detected radiation scatter in the transmitted radiation field 105 (such as x-rays) reaching each detector module compared to the continuous slit or slot detector design. A large continuous detector can now be approximated by a set of detector modules that would be much less expensive to construction and repair (or replace). It would also simplify the design of focused detectors if beam divergence requires compensation (Nelson, U.S. Pat. No. 4,937,453 and U.S. Pat. No. 5,258,145). Focused detector geometries include both flat and curved entrance surfaces. A drawback of the offset geometry is that there will now be multiple detector modules to align with the x-ray beams. Depending on the application and the offset between sub-slit or sub-slots and their detector modules, the x-ray beams for the certain detector modules may have to be blocked prior to and after exceeding, respectively, the desired scan area in order to avoid unnecessary dose to areas that need not be imaged. Although the benefits derived from employing sub-slit or sub-slot scanning geometries are described herein for use with scintillator-based x-ray detectors it should be apparent that the same benefits accrue to semiconductor-based and gas-based x-ray detector (or combinations thereof). For example, this geometry can be used with many types of detectors that provide adequate gain such as scintillators coupled to hybrid photo-emissive-photodiode arrays, micro-channel based detectors, gas detectors, micro-pattern gas detectors (that typically use a gas electron multiplier or GEM), etc.

Figure 2A:
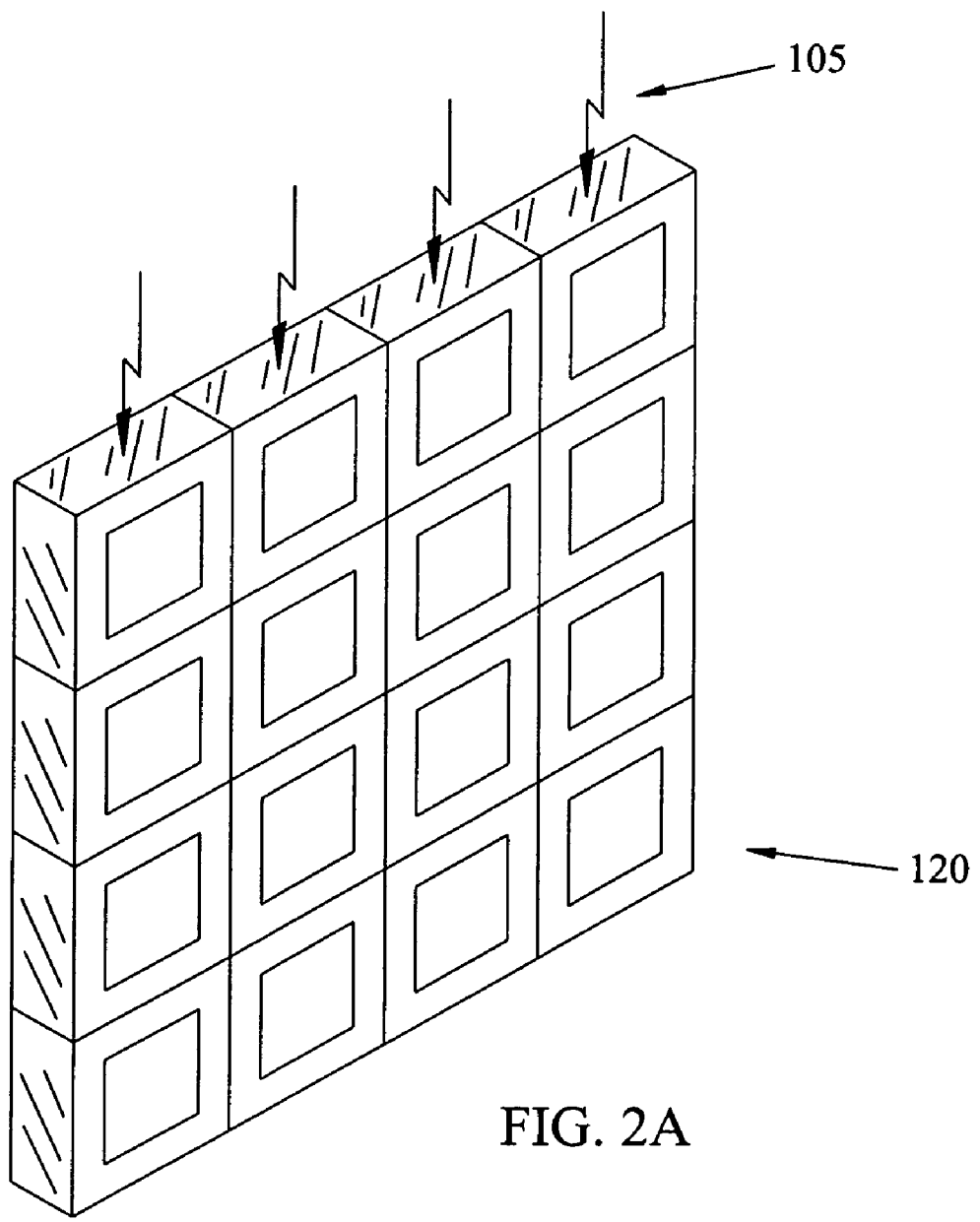
FIG. 2A illustrates a perspective view of an edge-on, discrete stack of scintillator elements useful for limited energy resolution and/or improved optical coupling efficiency. The scintillator array can be coupled to a discrete photodetector array or a strip array (or single) position-sensitive photodetector.
Figure 2B:
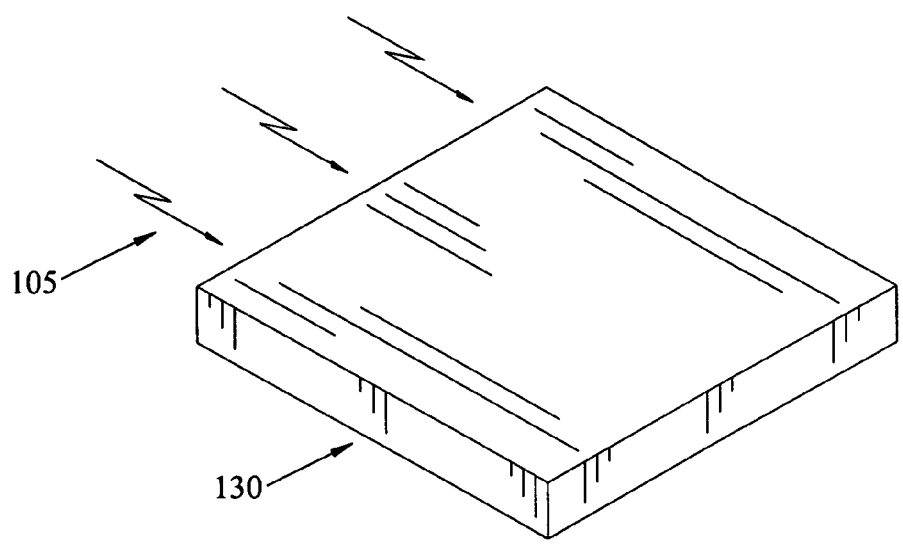
FIG. 2B illustrates a perspective view of edge-on, continuous and segmented scintillator sheets.
Figure 2B:
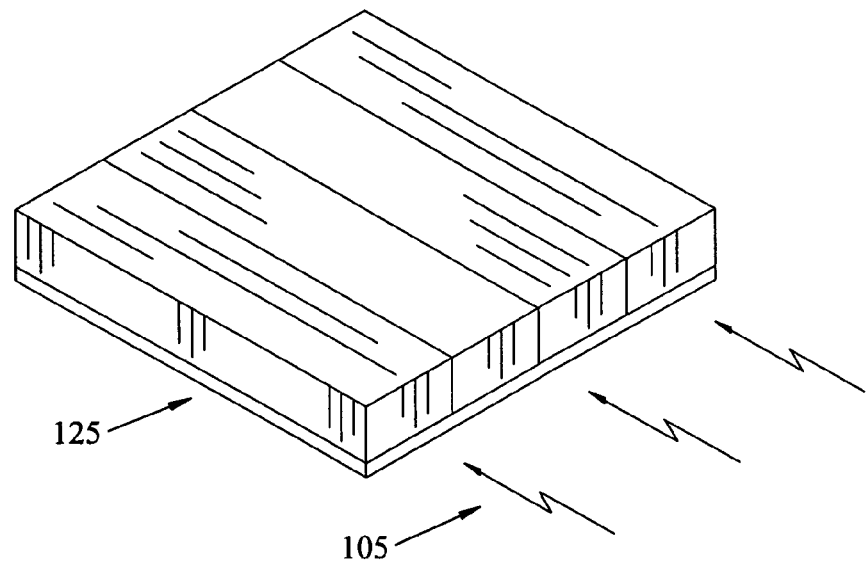

The slit scan detector can be comprised of a 1-D array (a single row parallel to the length of the slit which is assumed to lie in a horizontal plane) of discrete scintillator elements (scintillator elements that are partially or totally optically isolated from each other, including columnar scintillators) and coupled to a single photodetector readout element or share part of their optical signal with adjacent photodetector readout elements and determine the weighted position of the x-ray event. An alternate arrangement is to use a single continuous scintillator sheet and determine the weighted position of the x-ray event. Stacked, discrete scintillator elements 120 (of one or more scintillator materials) or continuous 130 (or segmented into discrete strip elements 125) scintillator sheets can be readout using discrete readout elements or position sensitive readout elements (FIGS. 2A-B). The stacking arrangement permits additional flexibility in that one or more conversion materials (referred to as converter materials and wavelength shifting materials) can be positioned between scintillator elements, on top of the first scintillator element, or both. Attenuator materials can be applied in a similar fashion.

Figure 5A:
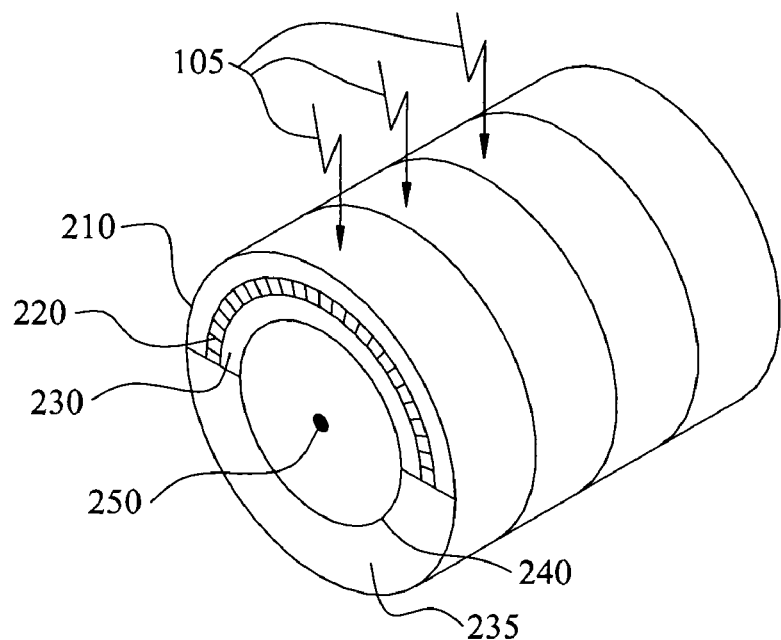
FIG. 5A illustrates a perspective view of a straw gas SAR imaging detector wherein a converter layer is present in the upper half of the straw gas SAR imaging detector.
Figure 5B:
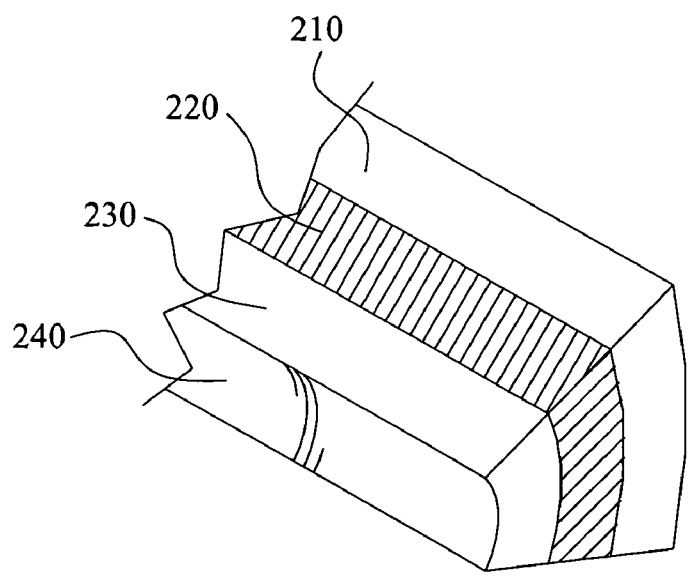
FIG. 5B illustrates a perspective view of a section of the upper half of a straw gas SAR imaging detector.

This arrangement (incorporating converter materials and/or attenuator materials) can aid in the imaging of mixed (in energy or particle type) radiation fields 105 or a radiation field for which the scintillator detector has a low detection probability. In some cases, such as dual energy detection devices involving a low energy and a high energy photon, the converter material may be replaced by an attenuator material (or it may serve a dual function as both converter and attenuator (filter) for a range of energies). For example, a material with a k-edge less than that of the low energy photon could be inserted between first and second sequential detector materials to act as an attenuator of the low energy photon. The same concept could be implemented by introducing an attenuator material in order to prevent a particle with particular properties from reaching the second detector material. Attenuator materials can be used with stacked scintillator materials, semiconductor materials, gas detector materials, or any combination thereof. Attenuator materials can be introduced between detector materials. Attenuator materials, as well as converter materials, can be used with edge-on (including SAR), face-on (including DOI) detector materials, or any combination thereof. The attenuator material may simply be a different detector material or a different thickness of the detector material or both. The use of converters may permit the use of scintillator materials with an attribute such as high scintillation conversion efficiency despite offering poor stopping power. Converter materials with high cross sections for x-rays and gamma rays or neutrons typically change the type of radiation to charged particles which can then interact with the scintillator. Wavelength shifting materials have the ability to shift scintillation wavelengths to a more favorable wavelength range for the photodetector and broaden the angular range of emissions. Thus, conversion materials can be situated between the scintillator elements of the stack in order to enhance detection efficiency. (Face-on stacks can also be implemented wherein conversion materials are placed between layers of the stack.) Wavelength shifting materials may be applied to one or more scintillator sides of the stacked scintillator-converter elements to improve readout detection efficiency (including readout configurations wherein a parallel fiber readout is implemented as described in Nelson, U.S. Pat. Application No. 20040251419). Thus deep stacks with many scintillator-converter layers can offer improved detection efficiency compared to the conventional detector designs that use a single scintillator-converter layer. (Note that the range of possible conversion materials is not limited to solids. Gases and liquids may also be used. In addition, conversion materials can be employed with semiconductor detectors, gas, and liquid detectors. Converter materials can be employed that enhance or reduce interactions with a number of radiation types including, photons, neutrons, protons, etc.) Converter materials have been used in PET imaging (with gas detector straws), radiation therapy portal imaging, industrial x-ray imaging, and neutron detection. In the case of PET imaging a stack of gas proportional detector straws (square or circular hollow fibers with a centered, thin, high resistivity wire anode), each straw incorporating a thin lead (converter) annulus, is used in SAR mode (event signals are measured at each end of the wire). For energies near 511 KeV the photoelectrons (and Compton electrons) emitted from the lead converter are preferentially forward directed, penetrate through a small depth of an isolation material, and ionize the gas within the hollow straw. Unfortunately, photoelectric events occurring in the lower part of the lead annulus of one straw in the stack must penetrate the upper part of the lead annulus of the straws immediately below it. Thus these photoelectrons are likely to be attenuated or suffer significant energy losses before creating a ionization signal in a lower straw. Improved implementations include a straw design in which only the upper part of the lead (converter) annulus is retained (a lead semi-annulus) while the lower part of the lead annulus is replaced with a suitable fiber material. FIG. 5A shows a near-end on view of a single straw gas SAR imaging detector with a central wire anode 250. The upper half of the straw detector consists of an outer plastic layer 210, a middle converter layer 220, an inner plastic layer 230 and a thin electrically conductive inner surface coating 240. The lower half of the straw detector consists of a single plastic layer 235 and a thin electrically conductive inner surface coating 240. Radiation 105 is shown as incident on the upper half of the straw detector. FIG. 5B shows an enlarged view of a section of the upper half of the straw detector. Yet another implementation is to use uniform hollow straws (typically circular, triangular, or square cross section) with no lead annulus and coat or cover the upper surface of each layer of straws with a thin lead (or other converter material) coating or sheet. For example, converter materials (or a mixture of converter materials) such as tungsten, lead, gold, uranium, etc. could be used for 511 KeV photons. Yet another implementation is to remove the straws but retain the parallel array of wires with gas and a converter sheet (with appropriate insulation material, if any) to comprise a single detector layer of a multilayer detector. Position-weighting techniques can be employed to improve the spatial resolution of ionizing radiation events. The converter sheets can be planar or shaped for a specific detector geometry. Spacers can be inserted between converter sheets in order to maintain a fixed distance between sheets. Another option is to assemble the multilayer detector using a well-known proportional wire chamber design based on crossed parallel wire arrays for x-y position information. (Although perpendicular crossed wires are typically implemented, other crossing angles can be utilized as needed.) Both the parallel and crossed parallel wire chambers are referred to as parallel wire chambers. Issues such as optimized gas materials and gas circulation, lengths of wires, supporting structures for long wires, etc. have been addressed in the literature concerning proportional wire chambers and straw detectors. An alternative implementation is to bore a 2-D array (1-D array designs can also be implemented) of fine holes in the converter sheets such that the individual wires can be strung through aligned fine holes (typically perpendicular to the surface of the converter plate). For this perpendicular wire chamber design the wires will typically be of greatly reduced length compare to the previous parallel wire design Each wire can be read out from a single end (a non-DOI 2-D detector) or at both ends (a 3-D detector with DOI capability) using position-weighting techniques. The converter sheets can be insulated from the gas and the wires by thin layers of materials such as plastic, glass, etc. if necessary. Both parallel (and crossed parallel) wire chamber and perpendicular wire chamber spatial resolution can be enhanced by weighting the signals from near-by wire readout units in order to estimate the spatial distribution (such as the centroid) of an ionizing event. Corrections to the energy and timing measurements can be implemented based on the position estimates and prior calibration data thereby improving energy and timing resolution. If not explicitly stated it should be recognized that in many instances, as a consequence of improved spatial resolution, at least one of improved energy and timing resolution may be achieved when weighted signals are acquired with gas, scintillator, or semiconductor detector designs (or combinations thereof) described in this invention. An additional implementation is to replace the hollow straws with scintillator rods (elements), scintillator fibers, thin (including amorphous and polycrystalline) semiconductor arrays, or microchannel plate amplifiers with readout. (In some cases a component of a scintillator material, for example, Cd, Li or Gd for neutron detection, acts as a conversion material.) If a continuous or very fine structured scintillator sheet (such as grown CsI:Na, CsI:Tl, CsI:Tl,Sm, etc. scintillator needles) is employed the weighted position of the ionizing radiation event can be determined (finding the signal intensity distribution such as the centroid) along the vertical and horizontal directions. Although stacks of converter layers are preferred in many applications, in some cases only a single converter layer will be needed. One or a combination of converter materials can be utilized based on particle type (charged particles, photons, neutrons, etc.) and energy, including mixed radiation fields. Different converter materials can be distributed spatially within individual converter layers to emphasize interactions with the incident radiation field or the downstream radiation field.

A converter sheet can be replaced with a continuous or structured sheet of a scintillator material coupled to a photoemissive cathode material on at least one of the sheet faces. Planar and curved scintillator sheet geometries can be implemented. A protective layer may be required between the scintillator sheet and the photoemissive cathode material. (Additional signal gain can be attained by employing a photoemissive cathode combined with an amplifier such as a microchannel plate.) For the case of one scintillator sheet and a parallel wire readout depth resolution is defined by the sheet thickness. For the case of a detector module comprised of two scintillator sheets bounding a shared parallel wire readout additional photodetectors can be positioned in a sparse configuration along the sides of each of the scintillator sheets or sensors can monitor their photoemissive cathodes in order to determine whether an interaction occurred in either scintillator sheet. In some detector scenarios 1-D or 2-D positional information can be obtain directly from the photoemissive cathode by monitoring its opposite sides or opposite corners using weighting techniques (PSAPDs are one example of an implementation of this technique). A simplified wire readout design can then be used. Stacking of these scintillator sheet modules can be used to enhance detection efficiency. Converter materials can be combined with the scintillator sheets depending on the application. If both sides of a scintillator sheet have a photoemissive cathode and are bounded by a set of parallel wires then DOI information can be determined by comparing the signals from the two sets of parallel wire readouts (a dual wire readout geometry). This detector module geometry can also be repeated in a stacked design. The thickness and material of the scintillator sheets can vary from top to bottom of the stack if constant depth resolution is not required or if the detector will be used to image multiple energies, particle types, or both. If a scintillator sheet is at either end of the stack it will not benefit from the dual wire readout geometry and must be designed appropriately.

Figure 2C:
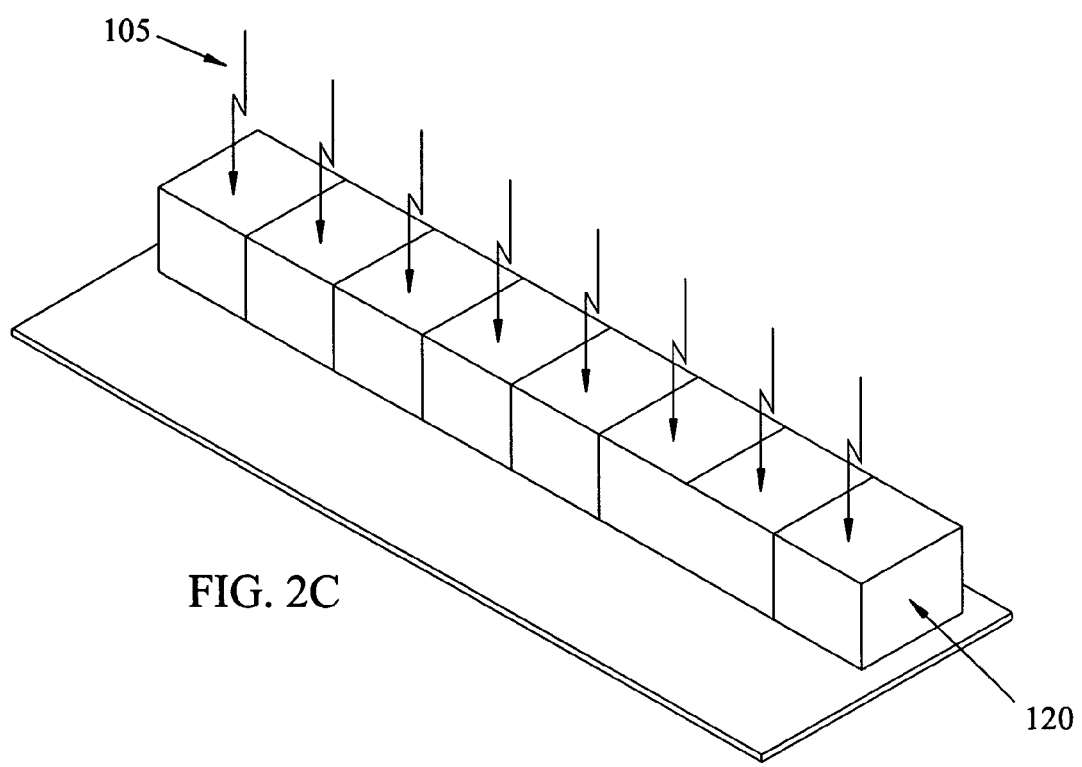
FIG. 2C illustrates a perspective view of a face-on, linear array of discrete scintillator elements.
Figure 2D:
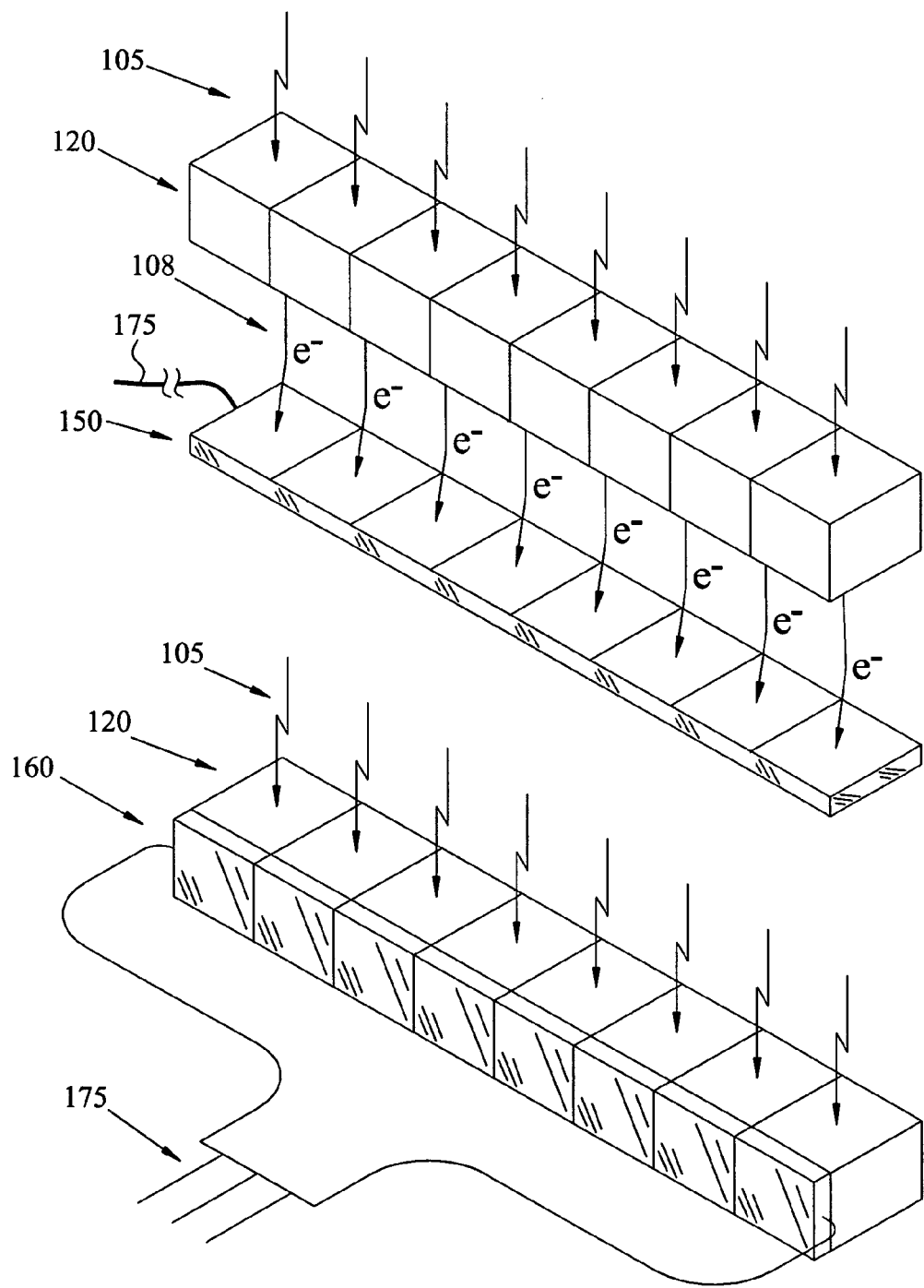
FIG. 2D illustrates a perspective view of an edge-on, linear array of discrete scintillator elements with a 1-D, position sensitive photomultiplier tube readout detector and a face-on, linear array of discrete scintillator elements with a 1-D, hybrid photoemissive-photodiode array readout detector.

Increased complexity of the readout electronics relative to the use of segmented scintillator sheet may be acceptable if sub-pixel resolution can be achieved. Determining the ionizing radiation event position by weighting requires reading out at least two detector elements (for example, two adjacent detector pixels or the two ends of a strip PSAPD) and so complexity is increased and maximum x-ray detection rates are reduced. The photodetector readout elements should provide high readout speeds and low noise. In addition to SSDs, photodetectors such as EMCCDs, APDs, PSAPDS, SiPMs, iDADs, etc. provide moderate to high gain (comparable to PMTs). In addition to position weighting features, these photodetectors permit the system to operate in an integration mode or a photon counting mode and not only an energy resolution mode. A photodetector array such as an EMCCD can be configured such that the vertical columns of pixels can be read out independently. The original design (Nelson, U.S. Pat. No. 4,560,882) for an edge-on detector (including stacked configurations) was optimized for the scintillators and photodetector readout devices available at that time (primarily integrating or low count rate readout detectors). Because dense phosphors with desirable atomic compositions, conversion efficiencies, and decay times are available and photodetectors with fast readout times are available it is now practical to implement photon counting as an alternative to energy integration for scintillator arrays 120 (FIG. 2C). Furthermore, face-on detector configurations may be acceptable using APDs, PSAPDs, SiPMs, iDADs, EMCCDs, etc. depending on the incident radiation field (typically x-rays) energy range and the response of the photodetector to ionizing radiation. Improvements in photoemissive cathode materials and electron readout rates allow edge-on or face-on slit scan designs based on 1-D, position sensitive photomultiplier tube 160 and 1-D, hybrid photoemissive-photodiode array readout devices 150 as well as 1-D scintillator-based intensifiers optically coupled to photodetector arrays, including microchannel plate amplifiers coupled to photodetector or metal arrays, etc. (FIG. 2D). Data may be transmitted 175 directly to a computer or processed at the detector or then transmitted to a computer. In an edge-on configuration the microchannel plate can also be used as a direct detector of x-rays with the additional capability of introducing thin layers of a converter material between successive rows or groups of rows of the hollow fibers that comprise the microchannel plate. The microchannel plate fiber material may be chosen so as to enhance the probability of x-ray interaction. Note that focusing of photoelectrons 108 is possible with these photoemissive detectors using conventional electron optics. Position-sensitive photoemissive detectors represent an alternative to PSAPDs, etc. In each detector configuration described in this invention it is understood that modifications to the scintillator surface and the introduction of internal structures can be made so as to optimize the photodetector readout signal (Nelson, Application No. 60/667,824 and Nelson, U.S. Pat. No. 5,017,782).

One advantage of the edge-on or face-on slit scan design is that the width of the slit can be designed to be adjustable. Thus the pixel dimension in the scan direction can be selected (within limits). This adjustable slit can be used with detectors comprised of one or two rows of detectors. This two-row (double-row) slit detector can also be identified as a simple slot scan detector. The scanner resolution could be tuned for a particular imaging application (finer scanning of a particular area), courser scanning for a thick object. A slit scan detector design that is appropriate for x-ray mammography might be suitable for a (lower resolution) chest scan, a radiation therapy portal imaging scan, etc. assuming two or more adjacent photodetector readout elements can be combined electronically. Scanning with multiple slits is well-known and can be used to improve x-ray tube output utilization. Variations in x-ray tube output can be monitored and compensated by measuring the x-ray signal with an independent x-ray detector or detector pixels that receive x-rays directly without passing through the breast. An attenuator with comparable properties (thickness, density, material composition) to the typical or specific attenuation of the breast being scanned can be interposed into the direct beam to provide a similar beam spectrum and x-ray statistics as seen by detector pixels involved in imaging. The attenuator can take the form of a stationary strip that is scanned along with the breast or it can move with the scanning slit or slot. This technique can be extended to other x-ray slit and slot applications. For example, in the case of chest imaging separate compensating materials could be used to approximate tissue and combinations of tissue, lung, and bone. (Note that this monitoring and compensation technique can be used with slit and slot scanning systems that use continuous large area detectors such as film-screen, Selenium, scintillator or semiconductor with amorphous silicon readout, storage phosphor plates, etc.) Many of the advancements described in the enhanced slit scan detector designs can be exploited for improved slot scan detector designs. Furthermore, since the equivalent of single or multiple slit and slot scanning (including focused and dynamic scanning) with face-on and/or edge-on semiconductor, scintillator, or gas detectors (with or without SAR or DOI capabilities) can be implemented in nuclear medicine imaging (Nelson, U.S. Pat. No. 6,583,420), the adjustable slit can also be employed in nuclear medicine scans to control scatter and spatial resolution. Various designs for the edge of the slit (straight, tapered, knife-edge, etc.) have been employed in nuclear medicine imaging systems for humans and small animals. For purposes of a slot (or an adjustable slot) scan the collimator can use a number of thin sheets (slats) of an attenuator material with fixed or adjustable spacing aligned along the slot axis. A second set of fixed or adjustable thin sheets can be positioned perpendicular to the slit or slot to define spatial resolution and limit scatter along the length of a slit or slot. Spacing can be adjusted mechanically by altering the spacing between sheets directly, for example sliding every second sheet out of the collimator doubles the spacing between remaining sheets. Another method is to move an entire set of sheets of fixed spacing out of the slit or slot opening and moving a different set of sheets with a different fixed spacing into the slit or slot opening. The weight (and cost) of the collimation used with slit and slot scanning in nuclear medicine can be substantial less than that of collimators used in conventional (large detector area) gamma camera designs. Variable scanning rates can be employed in order to improve local image count statistics. Preferably the collimating sheets are made from dense, high Z materials such as lead, tungsten, etc. permitting the detector to be located closer to the radiation source. Pinhole or coded aperture designs may be implemented in place of collimating sheets if efficiency or resolution gains are deemed significant.

Compton gamma camera detector modules can be employed with the slit or slot scan configuration (including focused and dynamic scanning configurations), eliminating the fixed or adjustable collimator entirely or replace them with a coarse Compton collimator (Nelson, U.S. Pat. No. 6,583,420, U.S. Pat. No. 7,291,841, and U.S. Pat. Application No. 60/667,824). The slit (or slot) can be adjustable and various designs can be used for the slit (or slot) edge (straight, tapered, knife-edge, etc.). These slit and slot scan (or multi-slit and multi-slot scan) Compton camera geometries greatly reduce the cost of implementing a large-area Compton camera. Coarse Compton collimation can be introduced as needed. The Compton scatterer (detector) material is placed behind the slit or slot and may extend beyond the border of the slit or slot in order to enhance the interaction probability with the incoming radiation (which has an angular distribution controlled, in part, by the slit or slot collimation). Various implementations include positioning the adjustable Compton scatter detectors behind, or along the side(s) of, or behind and along the side(s) of the Compton scatterer material (Nelson, U.S. Pat. No. 7,291,841, FIGS. 8, 11A-D). The Compton scatter detectors can be tilted as needed. Adjacent slits or slots may share Compton scatter detectors depending on their relative positioning. Edge-on or face-on (or a combination of both) Compton detector designs can be implemented using scintillators and semiconductors, a single semiconductor, or a mix of semiconductors. SAR and DOI capabilities can be employed. Stacking of face-on detectors, edge-on detectors, or a combination of face-on and edge-on detectors of the same or different semiconductor materials can also be utilized. It is relatively straight forward to stack multiple small, face-on 1-D or 2-D Compton scatterer semiconductor detectors (for example, diamond, silicon, germanium, CdTe, or CdZnTe arrays) with or without DOI capability to comprise a standalone "telescope" Compton camera or to combine the telescope design with a rear detector, side detector(s), or both to form a Compton camera that can exploit both the Compton gamma camera design (benefiting from increase Compton scatter probability due to a stack) and the Compton telescope design simultaneously. One or more 2-D (or stacked 1-D) edge-on Compton scatterer detectors (with or without SAR capability) can be used in place of the face-on Compton scatterer detectors. The equivalent effect of stacking can be achieved by mounting different edge-on detector materials in the same row and then irradiating edge-on along the axis of the row from the left or right side, that is, the other two exposed edges of the detector plane (Nelson, U.S. Pat. No. 7,291,841). Replacing the edge-on Compton scatterer detector configuration with a face-on Compton scatterer detector configuration is straightforward. Furthermore, offset and sub-slit and sub-slot scan Gamma camera, PET camera, and Compton camera designs for nuclear medicine imaging (but not limited to nuclear medicine imaging) can be employed. Individual sub-slits or sub-slots can be fixed or adjustable.

Designs that employ SAR scintillator detectors in a sub-slit or sub-slot geometry can reduce the length of the aperture (when the aperture is parallel to the length of the slit or slot) relative to what is required for full length slits or slots designs. For example, a slit or slot suitable for adult cardiac imaging or brain imaging may exceed 15 cm (150 mm) in length, leading to a large loss of signal (reduced energy and spatial resolution) with a SAR detector based on a dual photodetector (PMTs. SiPMs, etc.) readout design or other methods such as pulse shape analysis. For applications involving imaging with lower energy gamma ray (below about 150 keV), a sub-slit or sub-slot with a much shorter aperture length can be important for detecting a reasonable fraction of optical signal generated within the scintillator. Sub-slit and sub-slot imaging geometries can result in improved energy and spatial resolution, improved detection rates, lower manufacturing costs, and may allow the use of a different detector material or readout devices. For the case of SAR scintillator detector used in (typical) dual-readout mode or pulse shape analysis readout mode (such as phoswich combinations or continuously-variable scintillators) a PMT or other photoemissive detector such as hybrid photoemissive-photodiode detectors could be used in place of an APD (or SiPM, etc.). Non-SAR designs could employ one or more scintillator linear arrays, stacked linear arrays (Nelson, U.S. Pat. No. 4,560,882), or linear arrays of sheets that could be readout from the side by a continuous detector such as a PS-PMT or PS-APD or a sparse array of APDs or SiPMs with focusing optics (for example).

A dual-use configuration is to combine the capabilities of a scanning Compton camera with a scanning conventional Gamma camera. This could involve mounting a collimator directly in front of a Compton scatter detector material (see for example FIGS. 1, 11B of Nelson, U.S. Pat. No. 7,291,841) that would be positioned directly behind the Compton scattering material, allowing simultaneous operation in both modes. Another dual-use design would mechanically move a collimator in front of the Compton scattering material (creating an additional gap between the collimator and the desired edge-on detector) or mechanically move the Compton scattering material out of the way before moving the collimator into position. A variety of collimator designs (focused hole, parallel hole, knife-edge, pinhole, non-uniform, coded-aperture, rotating) can be utilized depending upon the application and detector geometry. If dual-use includes PET imaging, deployment of a collimator may not be necessary and removal of Compton scattering material may be optional. Removal of the Compton scattering material is not an issue if the Compton scatter material and the Compton scatter detector material are the same (this includes those implementations wherein reconstruction is based on multiple Compton scattering). Additional combinations are to use two different detector materials in a Compton camera configuration wherein the first detector material acts as a scatterer or a scatterer and detector while the second detector material acts as a detector for scatter from the first material and as a scatterer and detector.

Compton gamma cameras can have tiltable detector modules as described by Nelson (U.S. Pat. No. 7,291,841). This technique can be extended from planar Compton gamma camera designs to include single and multiple slit (or slot) Compton gamma camera designs. Tilting can be particularly advantageous when the inactive detector thickness at the edge surface is considered significant (reducing detection efficiency) or if the slit (or slot) aperture opening is wider than the detector aperture height defined by the edge (in which case the aperture opening can be filled). If the aperture opening is adjustable then the tilting of the edge-on detector module can be synchronized with modifications to the aperture opening. Tilting of the edge-on detector module can also be implemented in single or multiple slit (or slot) edge-on gamma camera designs. Issues related to changes in detector efficiency spatial dependence should be considered before implementing edge-on detector module tilting.

Figure 3A:
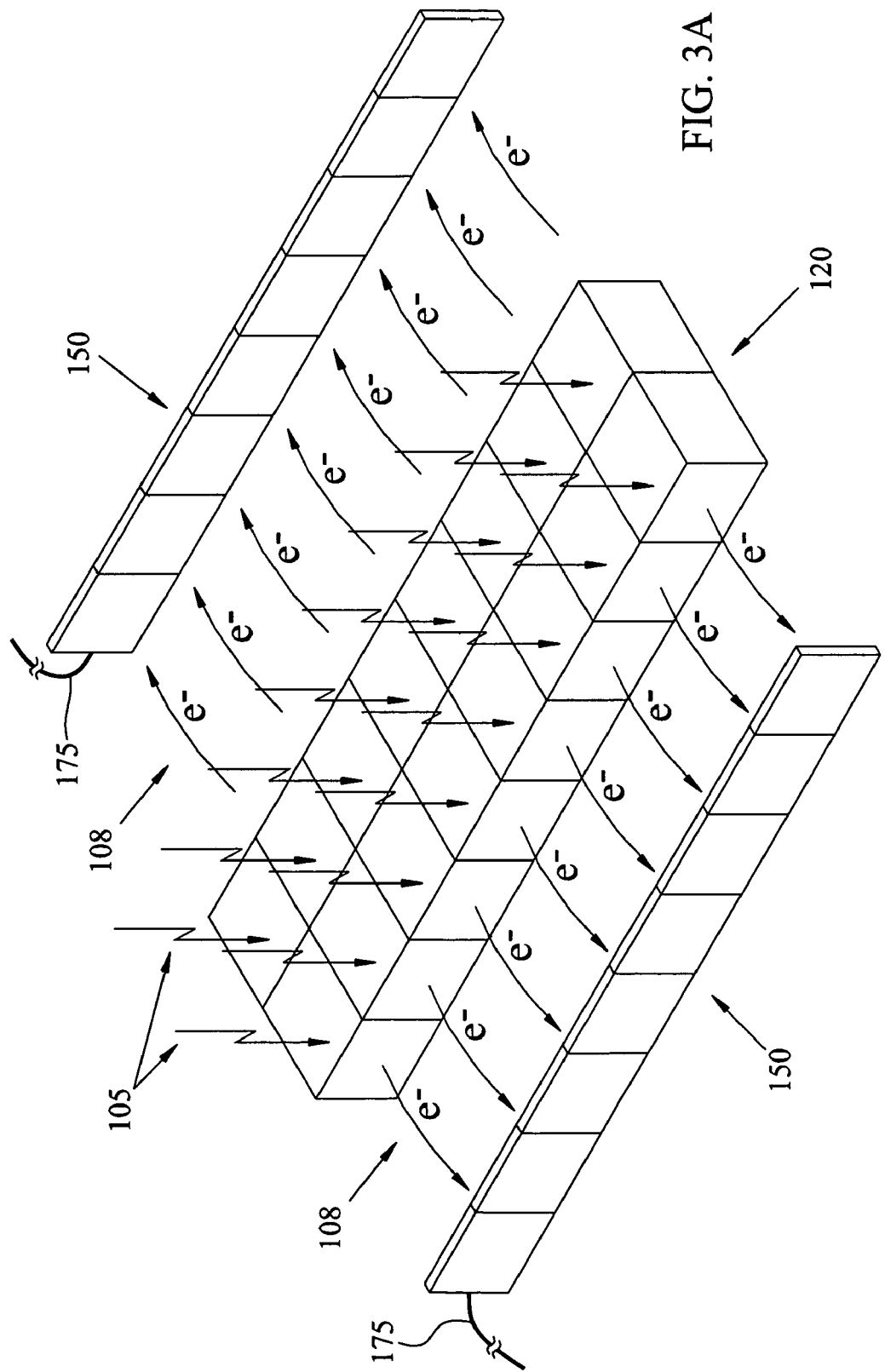
FIG. 3A illustrates a perspective view of two edge-on, linear arrays of discrete scintillator elements with two 1-D, hybrid photoemissive-photodiode array readout detectors.
Figure 3B:
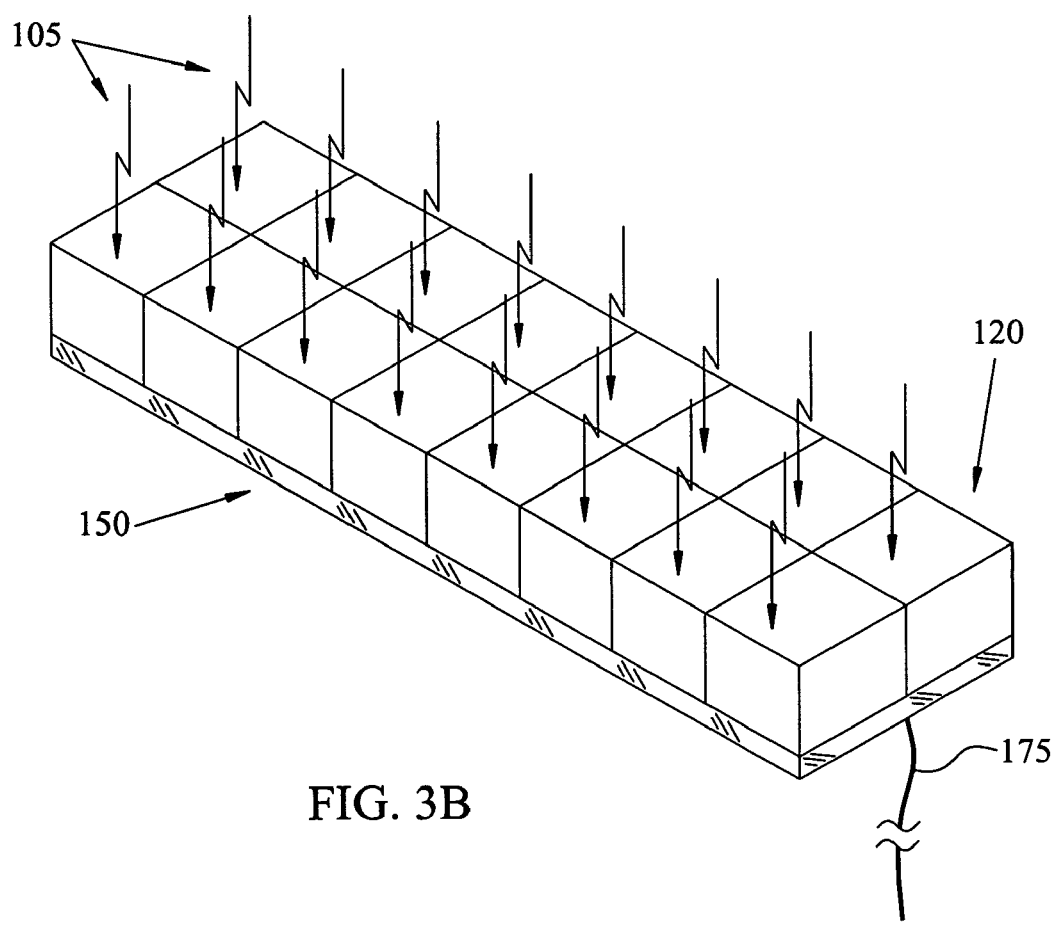
FIG. 3B illustrates a perspective view of two face-on, linear arrays of discrete scintillator elements coupled to a photodetector array (such as a 2-D APD, iDAD, or SiPM array).
Figure 3C:
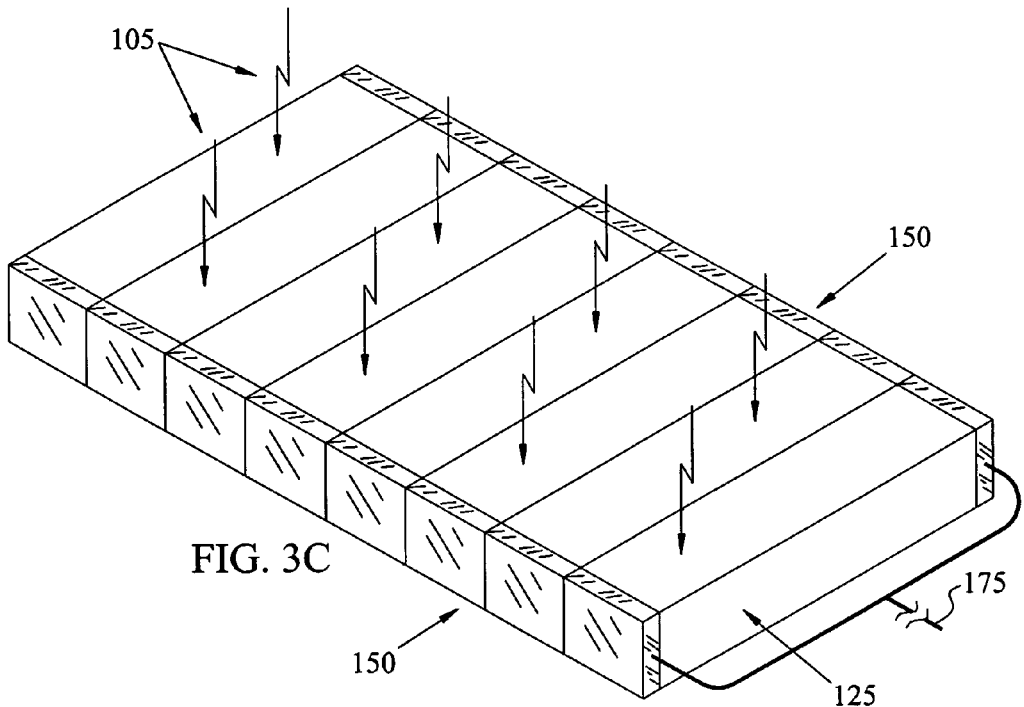
FIG. 3C illustrates a perspective view of an edge-on SAR detector geometry wherein linear photodetector arrays (or alternately strip position-sensitive photodetectors) are coupled to the ends of a segmented scintillator sheet.
Figure 3D:
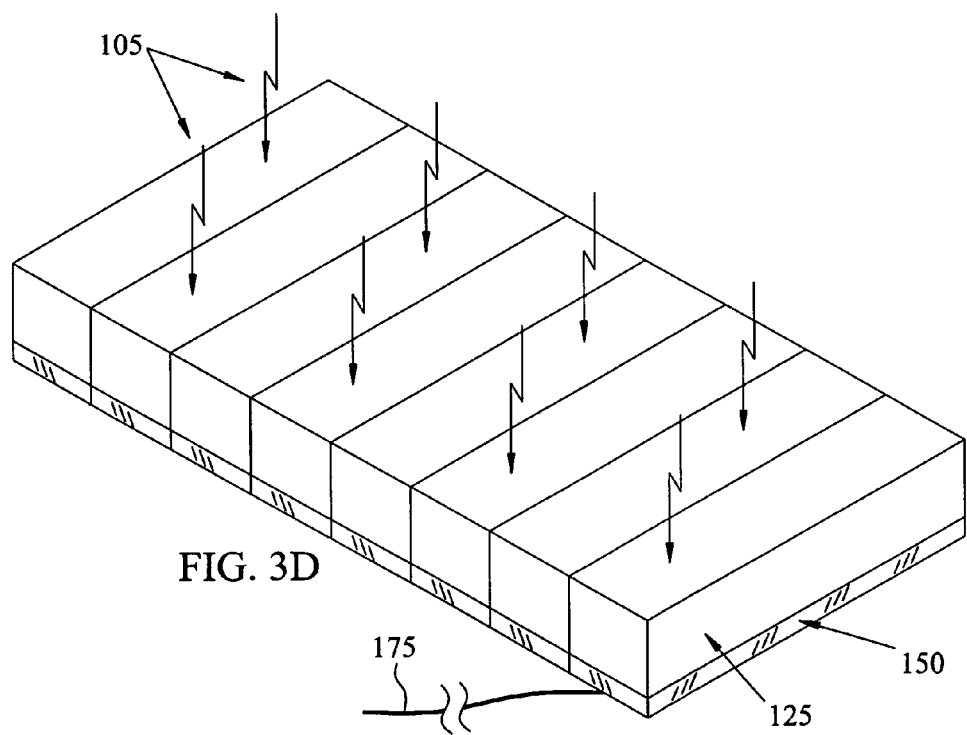
FIG. 3D illustrates a perspective view of a face-on SAR detector geometry wherein a 2-D photodetector array (alternatives include strip position-sensitive photodetectors, a position-sensitive photodetector, and various photo-emissive detectors) is coupled to a segmented scintillator sheet.

Simple slot scan detector designs are shown in FIGS. 3A-D. Simple slot scan detector designs have at most two rows of readout elements 150 (such as two rows of discrete photodetectors, 2-D position-sensitive photodetectors with readouts at the four corners, and 1-D (strip) position-sensitive photodetector linear arrays with readouts at the two ends of each strip). (Additional detector designs with a single row of readout elements are described in Nelson, Application No. 60/667,824.) The most basic of the simple slot scan designs uses two discrete rows of edge-on or face-on scintillator elements 120 (FIGS. 3A-B) coupled to either two photodetector arrays or a 2-D position-sensitive photodetector or a 1-D position-sensitive photodetector linear array. Although FIG. 3A shows a 1-D hybrid photoemissive-photodiode array readout other photodetector readouts discussed (position-sensitive PMT, APD array, SiPM array, iDAD array, EMC-CDs, etc.) can be implemented. In a similar manner FIG. 3B shows a scintillator array coupled to an APD or SiPM array. Alternatives include a 2-D hybrid photoemissive-photodiode array, an EMCCD configured such that the horizontal columns of pixels can be read out independently. If the scintillator is a continuous sheet (or segmented scintillator sheets) then SAR can be implemented for either face-on or edge-on detector designs (FIGS. 3C-D). SAR implementations in one or two dimensions will reduce the maximum readout rates. One-dimensional SAR implementations as shown in FIGS. 3C-D are easier to deploy. FIG. 3C shows a photodetector array 150 at each end of a segmented scintillator sheet 125 (basically an array of scintillator rods) in an edge-on geometry. (Note that this represents the simplest case (a single layer) of the various stacked SAR and stacked DOI detector designs described in this patent.) For a sufficiently low count rate position-sensitive photodetectors could be positioned at each end. FIG. 3D shows a face-on geometry wherein the photodetector array 150 could be comprised of rows of discrete photodetectors or a single row of position-sensitive strip photodetectors with readouts at the ends of each strip (Nelson, Application No. 60/667,824). A 2-D position-sensitive photodetector readout could also be utilized, but the maximum count rate would suffer. Discrete and position-sensitive photoemissive detector readouts can be implemented in FIGS. 3B-D if desired. If the SAR resolution exceeds two pixel in one dimension then there may be a net savings in the number of readout elements. Many advantages associated with the slit scan detector design carry over to the simple slot scan detector design. While the simple slot scan design seems like a minor improvement with respect to the slit design, it offers the possibility of at least doubling the overall detector efficiency (although a detector area gain factor less than two can be selected by increasing the slot width by a factor less than two relative to corresponding slit width). An adjustable slot width permits the resolution along the slot width dimension to be altered for a specific application. (For example, assume the middle of the slot width is aligned with the boundary between the two rows of scintillator elements show in FIGS. 3A-B.) Energy integration and photon counting modes can be utilized with two discrete rows of detectors. The photon counting mode should be used for SAR detector designs. Limited energy resolution can be implemented in an edge-on configuration (Nelson, U.S. Pat. No. 4,560,882). The simple slot scan geometry with two rows of detectors also represents the smallest increase in detected x-ray scatter relative to the slit scan design (an important feature). Continuous slot detector and offset sub-slot detector module configurations can be implemented. The scintillator detectors shown in FIGS. 3A-D are collectively referred to as simple slot scan detectors.

Figure 4A:
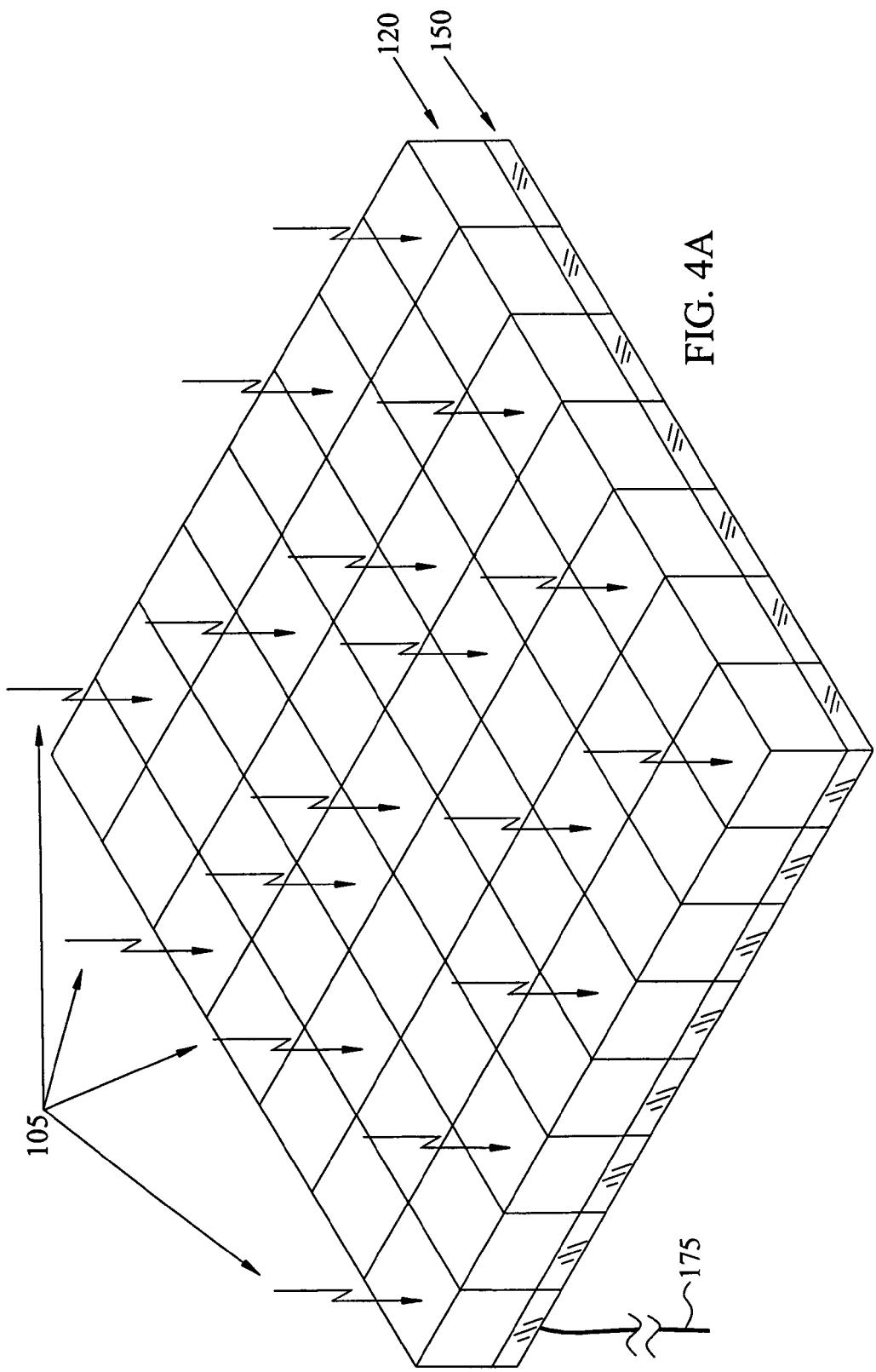
FIG. 4A illustrates a perspective view of a face-on, multi-row scintillator array coupled to a photodetector array.
Figure 4B:
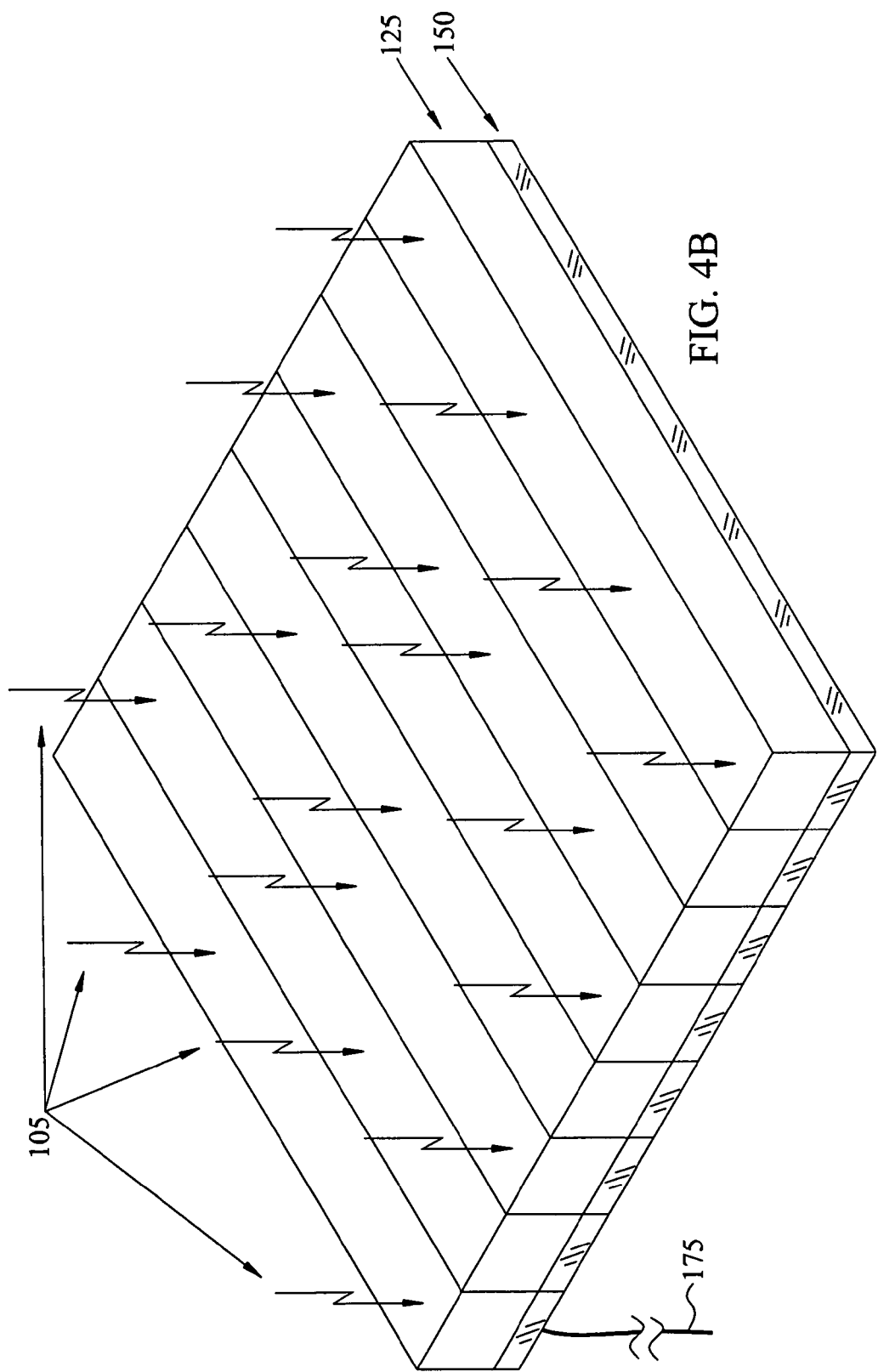
FIG. 4B illustrates a perspective view of a face-on SAR detector geometry wherein a segmented scintillator sheet is coupled to a photodetector array.

Multi-row slot scan designs use three or more rows of face-on detectors or edge-on detectors. Edge-on detectors with fiber or borehole connected readouts are described in Application No. 60/667,824 (Nelson). Multi-row slot scan designs with face-on detectors can be used in energy integration, photon counting, or energy resolution mode. FIG. 4A shows a face-on, multi-row, discrete scintillator array 120 coupled to a multi-row photodetector array 150. The photodetector array can be comprised of photoemissive detectors (microchannel plates, hybrid photoemissive-photodiode detector, etc.) or detector arrays of SiPM, APDs, etc. that provide amplification (or very low noise readout such as Si drift detectors). SAR implementations can also be used in a photon counting or an energy resolution mode. SAR implementations in one or two dimensions will reduce the maximum count rate. FIG. 4B shows a face-on, SAR implementation in which a segmented scintillator sheet 125 is coupled to a multi-row photodetector array 150 operating as a position-sensitive photodetector array. (This configuration could be used to improve the readout rate relative to a position-sensitive strip photodetector with a readout at the two ends of the strip.) Discrete and position-sensitive photoemissive detector readouts can be implemented in FIGS. 4A-B as an alternative. The multi-row slot scan geometry offers an increase in x-ray tube output utilization but detected x-ray scatter also increases relative to the slit scan (and most simple slot scan design implementations). Continuous slot detector and offset sub-slot detector module configurations can be implemented. The scintillator detectors shown in FIGS. 4A-B are collectively referred to as multi-row slot scan detectors.

SAR designs (including 3-D SAR detectors) can incorporate converter materials in the manner described for the stacked edge-on detector geometry. In some cases a component of a SAR scintillator material, such as Li or Gd for neutron detection, acts as a conversion material. Offset single or multiple sub-slit and sub-slot scanning can be implemented in nuclear medicine imaging with face-on and edge-on semiconductor, scintillator, or gas detectors (Nelson, U.S. Pat. No. 6,583,420). SAR and DOI techniques can be employed. Fixed or adjustable collimators (as previously described for slit and slots) can be employed. Alternatively, Compton gamma camera detector modules (with or without coarse Compton collimators) can be used with single or multiple offset slit and slot scan formats.

The technique of introducing attenuator materials between levels of elements within a detector stack may be extended such that attenuator materials are positioned between individual or groups of detector elements so as to limit radiation cross talk between detector elements, for example due to Compton or Rayleigh scatter photons, characteristic x-rays, and energetic electrons and thus improve spatial resolution. (The same cross talk processes are encountered in nuclear medicine imaging and diagnostic x-ray imaging.) This is frequently referred to as internal collimation. One or more septa materials can be introduced within the scintillator, semiconductor, or gas (or any combination thereof) detector in order to shield a detector element or a group of detector elements from one or more types of radiation escaping from one or more neighboring detector elements or groups of detector elements. Septa properties can be varied to compensate for factors such as a non-homogeneous incident radiation field or a radiation field with characteristics that change with detector element penetration depth. Escaping radiation can be the result of external particles interacting with the detector element or internal emissions due to the presence of radioactive material. In many instances the septa material is adjacent to at least one wall of a detector element. In other scenarios the septa material surrounds a cluster of detector elements. Typical septa formats are cut sheets of septa material or deposited layers (coatings) of septa material. Other septa formats include diffusing the septa material into the detector material or initiating a chemical reaction at the surface of the detector material. For example, septa sheets or deposited layers of septa material that provide partial shielding between groups of detector elements can be located between individual rows of edge-on detector pixels. Thus 1-D shielding could be implemented between rows of scintillator elements (or scintillator sheets), between rows of scintillator rods with SAR capability, or between rows of semiconductor detector elements. In general 1-D shielding can be used with edge-on and face-on detector designs. Gaps may be introduced between detector elements and septa sheets if direct contact between the detector and septa materials is to be avoided. The presence of gaps may be used to circulate a coolant. Another option is to coat the sides of detector with a non-conductive material so that a septa coating can be applied directly to the detector or a septa sheet can be positioned closer to the detector. Still another option is to insulate the septa sheet. Septa can conform to the geometry of the detector elements. Septa can be introduced between individual detector elements within a row of detector pixels or between detector elements within a 2-D array of detector pixels (see for example Nelson, U.S. Pat. No. 5,258,145). The thickness of the septa is typically chosen so as to limit its impact on the reduction of useful detector volume and on spatial resolution. Septa materials may become a source of secondary radiation. Thus septa designs may use a layered material approach wherein problematic secondary radiation from a material such as lead, gold, uranium, etc. is mitigated by another material of lower atomic number. Septa material composition may even change with respect to the 3-D spatial location within the detector in order to compensate for the distribution of incident particle types (photons, charged particles, uncharged particles) and energies. Thus the selection of one (or more) septa materials will be influenced by the incident radiation field particle composition and energy distribution, the densities and atomic composition of the detector and septa materials, the dimensions of the detector pixels, and the ability of the detector pixels to reject radiation due to septa materials as well as neighboring pixels or groups of neighboring pixels. A device such as a x-ray mammography detector (very high spatial resolution with typical pixel dimension on the order of 25-100 microns) would use thin septa such as sheets, foils, thin films, chemical or vapor deposited coatings, etc., depending on the detector design. The septa could be introduced only between rows of pixels (in some designs) or between individual pixels. A chest x-ray detector (coarser spatial resolution and higher x-ray energies) could use thicker septa. In the case of septa applied between rows of pixels, additional fine collimation may be introduced within the scanning x-ray beam to match the septa positions. For example, consider a slot scan format using discrete rows of detector pixels with thin septa between rows. A slot collimator could incorporate sub-collimation that would project the x-ray beam onto the location of the septa (creating a number of adjacent fan beams in one implementation or a 2-D array of micro-beams in another implementation). Sub-collimation could be used to reduce detected scatter relative to an open slot. Septa can be incorporated into slot scan detector designs that employ scintillator, semiconductor, or gas detectors (or any combination thereof). Sub-collimation can be implemented in slit (or multiple slit) scan designs. Sub-collimation designs should account for any significant effects due to the use of a diverging x-ray beam and may be employed independent of the use of internal septa. Internal septa can be used with high resolution face-on and edge-on detectors. Internal septa collimation has been used in the past for low spatial resolution nuclear medicine imaging (placing individual detector elements directly into the holes of a gamma camera collimator). In these cases the internal collimation itself largely defined the spatial resolution of the detector system.

It is straightforward to apply the use of septa for nuclear medicine imaging detectors as described in U.S. Pat. Application No. 20040251419 and Application No. 60/667,824 (Nelson). The choice of septa material will be influenced by the atomic number and density of the material and the energy range and type of the incident radiation (x-rays, gamma rays, charged particles, neutral particles). In some cases the septa material may also function as an optical reflective material (for example: aluminum, copper, silver, chromium, gold, platinum, rhodium, iridium, etc.). Yet another means of reducing cross talk is to estimate numerically (by experimental or Monte Carlo simulation means) the weighted cross talk contributions from neighboring detector elements to the signals recorded by a specific detector element. Each detector element can be irradiated discretely and the signals due to the direct radiation and radiation scattered back into the detector element can be detected and recorded. The cross talk radiation signals detected by near and distant detector elements can be recorded. An iterative process can be used to estimate the weighted contributions, including energy-dependent contributions, to the total signal detected by a detector element that are the result of cross talk due to near or distance neighbor pixels. A total correction factor is then applied to each detector element or pixel. Additional corrections can be applied to those detector elements that experience cross talk due to the presence of the detector support structure. The determination of appropriate correction factors for detector elements can be further aided by introducing reference objects of known contrast (for x-ray imaging) or of known intensity and energy (for nuclear medicine imaging) into the detector field of view. The improved (more-optimal) correction factors will result in enhanced imaging of these reference objects. This numerical approach to reducing the effects of cross talk is applicable for x-ray radiography (including radiation therapy imaging) and nuclear medicine imaging. Internal collimation and numerical cross talk reduction techniques can be used together. Internal collimation and numerical cross talk reduction techniques can be used with face-on and edge-on detector geometries and mixed detector geometries.

Efficient readout of the scintillation signals can be constrained by several factors including optical self-attenuation, internal optical (geometric) trapping, and spectral mismatch with the photodetector. Optical self-attenuation and trapping could limit the useable scintillator pixel volume or the length of a SAR detector element. Silicon photodetectors typically have a poor spectral response in the deep blue and UV (and some photoemissive materials have a poor response in the UV). Some scintillators are highly self-attenuating in the UV. Coating one or more walls of a scintillator pixel or SAR element with a wavelength shifting (WLS) material can help reduce geometric trapping and self-attenuation while providing a better optical match to the photodetector. The WLS material can be applied directly to a scintillator wall (including outer surface walls and internal structure walls), to a wall coated with a low index of refraction material (promoting total internal reflection) or a multilayer material. Techniques such as Supercritical Angle Fluorescence (SAF) may be employed in order to couple WLS fluorescence efficiently into neighboring surfaces. The WLS material can also be backed by a highly reflective material such as specular, diffuse, multilayer, and directional or focusing micro-reflector array materials (including materials such as 3M Industries retro-reflecting tape). The reflective material will increase the probability that incident photons will be shifted and that shifted photons (wavelengths) will be returned to the scintillator medium. An alternative is to encapsulate the WLS material and then place it against the wall. The encapsulating medium may be structured and include a reflective backing as described. (For certain detector designs the WLS photons propagate preferably within the encapsulated WLS core instead of back into the scintillator. For example, the WLS fiber array used in a cross-coupled readout arrangement with stacked, parallel scintillator rods (elements) as shown in FIG. 4B of "Nelson R, Edge-on SAR Scintillator Device and System for Enhanced SPECT, PET, and Compton Gamma Cameras, U.S. Pat. Application No. 60/667,824. Filing date: Mar. 31, 2006" and described in "Nelson R, Modular Edge-on DOI Scintillator Detectors for SPECT, PET, and Compton Imaging, U.S. Patent Office Disclosure Document No. 567471, Dec. 28, 2004". In this case the contact entrance surface of the fibers may optionally be structured so as to favor one direction of propagation versus two directions as shown in FIG. 2B (a form of focusing optics). A reflective backing may also have a directional nature so as to enhance the fraction of wavelength shifted light produced and to increase the likelihood that the WLS light stays in the fiber or fibers and travels to the end with a photodetector readout. Coupling of light into the fiber can be aided by introducing low index of refraction coupling materials and/or structuring at least one of the fiber surfaces, the scintillator contact surface (including forming focusing optics structures such as Fresnel and GRIN microlenses, Selfoc lenses, lens microarrays, and nanostructures). The fiber end without a photodetector readout is typically covered with a reflective material. An alternative is to cover that end with a WLS material and a reflective material. A decrease in the number of photodetector readout elements used in this design can be attained by cross-coupling a WLS fiber bundle (or a conventional fiber bundle without WLS material) between upper and lower rows of scintillator rods (SAR elements). Both contact entrance surfaces of the fibers may optionally be structured so as to favor one direction of propagation. The described benefits of using focusing optics with WLS fibers are also applicable to non-WLS fibers. A further advantage of employing fiber or WLS fiber bundle readouts for position information is that they can be used with both flat and curved scintillator geometries (including face-on and edge-on linear arrays). For example a ring detector can be comprised of one or more modular annular scintillator layers, each layer coupled to a fiber (or WLS fiber) array oriented (typically) perpendicular to the direction of the scintillator crystal readouts. Another example is a single layer (or multiple layer) curved scintillator array detector module behind a knife-edge slit (sometimes used as a collimator for nuclear medicine imaging). The scintillator array elements may be parallel or perpendicular to the slit with the fiber array perpendicular to the direction of the scintillator elements. Sharing a fiber array (or WLS fiber array) between multiple detector modules may be cost-effective for certain designs.

Although fibers represent an inexpensive method for enhancing spatial resolution coupling efficiency with the scintillator rods may be problematic. An alternative is to replace the fiber array with a thin photodetector readout array utilizing detectors such as SDDs, PDs, APDs, SiPMs, iDADs, EMCCDs, etc. Costs could be kept low by implementing the readout array as a sparse photodetector array using small pixels and a large pixel pitch. Cost savings can be achieved by implementing a position-sensitive readout technique with the sparse array. The goal would be to use enough detector elements to measure an adequate signal for the spatial location of an event along the length of a rod without the expense of trying to measure good energy resolution for an event. That task is delegated to the photodetectors coupled to the end of the scintillator rods. Directional micro-reflector materials and structured surface treatments (including Fresnel and GRIN microlenses, controlled surface roughness, etc.) can be utilized to improve the optical collection efficiency of photodetector elements and reduce the cost of the sparse readout photodetector array. Additional cost savings would be possible by using detector elements that are optically sensitive from both sides, permitting sharing the sparse array between upper and lower arrays of scintillator rods. Further encoding can be implemented by using patterns of WLS materials on the walls of the scintillator rods. Different WLS materials may emit different colors and/or exhibit different time delays in emission. Spatial resolution can be enhanced by using at least one of the direct signal, a color-dependent signal, and a time-dependent signal (for example, a delay-dependent signal). In one instances, appropriate color filters would be applied to preferred photodetector elements. Appropriate reflective backings can be employed with the WLS materials. A further advantage of employing sparse arrays of photodetector readouts for position information is that they can be used with flat scintillator geometries. Curved scintillator geometries require flattening of the contact surface locations or positioning focusing mechanisms (lenses, fibers, etc.) at the contact surface locations. Sparse arrays of photodetectors can be used with face-on and edge-on linear and 2-D scintillator arrays).

WLS materials (encapsulated or as coatings) can be applied to one or more bare or coated scintillator rod walls within a stack (one or more layers) of cross-coupled arrays (typically, but not limited to, perpendicular layers) of scintillator rods or cross-coupled fiber arrays and scintillator array rods. WLS materials can also be applied or incorporated into fiber arrays. (Note that wall coatings referred to in this invention can include thin layers of air or a gas as well as conventional optical coupling materials with a relatively low index of refraction. Patterns of thin spacers may be used to separate adjacent scintillator rods, scintillator sheets, or WLS materials. In general, uniform or spatially-varying scintillator wall film coatings such as metal, dielectric, and multilayer films can be used to control total internal reflection.) Encoded patterns of WLS materials may be employed as well as uniform configurations of WLS materials. WLS material applied to non-contact scintillator walls can be backed by a reflector material. WLS materials (encapsulated or as coatings) applied to the contact walls between stacked cross-coupled arrays of scintillator rods (whose layers may be comprised of the same or different scintillator materials) will not have reflective backings (see FIGS. 4A-B of U.S. Pat. Application No. 60/667,824 and also a description in "Nelson R, Modular Edge-on DOI Scintillator Detectors for SPECT, PET, and Compton Imaging, U.S. Patent Office Disclosure Document No. 567471, Dec. 28, 2004"). In this case a fraction of the WLS photons will couple into one or more cross-coupled rods and then read out by discrete or position-sensitive photodetectors, permitting a weighted spatial position to be determined. A weighted spatial distribution can be determined within a layer of rods by using a 1-D or 2-D position-sensitive or pixellated photodetector array depending on the spatial resolution attainable within individual rods comprising a layer. (This technique can be used for conventional layers of rods as well as cross-coupled layers of rods in a detector.) For example, a 1-D position-sensitive photodetector spanning a layer of rods along a readout surface may provide 1-D "sub-pixel" resolution within a single rod output surface element that could improve the SAR capability and preferably 3-D spatial positioning within the rod. A 2-D position-sensitive photodetector dedicated to a single layer could provide 2-D "sub-pixel" resolution within a single rod output surface element that could improve SAR capability even further and preferably improve 3-D spatial resolution even further within the rod. (This assumes prior encoding of 3-D event position within a scintillator rod and the corresponding optical signal distribution seen on a scintillator rod readout surface.) Multiple 1-D position-sensitive or pixellated photodetectors can be substituted for a 2-D position-sensitive or pixellated photodetector depending upon costs and energy resolution requirements for conventional layers of rods as well as cross-coupled layers of rods. A large area 2-D position-sensitive or pixellated photodetector may be used with multiple layers of conventional or cross-coupled layers of rods (in which case there will be unused photosensitive areas in the cross-coupled layers design). Fiber optic arrays can be used to couple the output surfaces of cross-coupled layers to a single position-sensitive or pixellated photodetector (reducing costs but also efficiency). The scintillator rods within a layer need not be optically-isolated. For example, a low index of refraction coupling medium between adjacent rods within a layer or between cross-coupled layers is a simple method of controlling the directionality and fractional transmission (via critical angle for transmission) of optical photons between the adjacent surfaces (which may be smooth or rough). If pairs of cross-coupled layers are not optically isolated then this technique can be extended to form a continuous 3-D detector if signal losses are acceptable. Surfaces, or a layer of material between surfaces, may be structured, as described previously, so as to promote directional coupling of photons whether a WLS material is present or not. Non-contact walls, including the wall opposite the photodetectors, can be covered with reflective materials or with WLS materials (optionally different from the WLS material at the contact surface) and reflective materials. The degree of surface roughness may be optimized. The reflective materials can optionally be of a directional nature. For example, an array of focusing lenses such as Fresnel or GRIN lenses, Selfoc lenses, etc. between two cross-coupled scintillator rods could focus WLS optical signals onto directional mirrors or micro-mirrors, scintillator optical signals onto directional mirrors or onto WLS-coated directional mirrors located on the opposite surface from the interface between the cross-coupled scintillator rods (or a combination thereof). The directional mirror would help guide the signal to the readout detector. Yet another technique would be to optimize the degree of surface roughness on the opposite surface from the interface. A reduced index of refraction layer of material between the scintillator surfaces will result in a partially-directional transmission of optical photons which can then be guided (to a degree) to the readout detector by employing at least one of these optical means for modifying the directional distribution of the optical signal including directional mirrors, WLS-coated directional mirrors, WLS with a mirror backing, WLS, roughened surfaces positioned on one or more non-contact walls. (These optical means for changing directionality may be implemented as part of a coating or film applied to specific surfaces of the scintillator rods and not just to scintillator rod surfaces. For example a low index of refraction plastic film, which inherently provides total internal reflection for a range of incident angles, can be deployed with embedded directional mirrors or a roughened surface combined with a reflective coating.) Additional information about the location of an event can be acquired if a spatial structure (spatial dependence) is implemented with these optical means. For example, spatially-varying the degree of surface roughness, using WLS stripes (or mixing WLS stripes with different properties), etc. Preferably the implemented design would then be calibrated. Although varying surface roughness or using WLS materials are well-known techniques for reducing optical trapping of the transmitted optical photons other possible methods include introducing structures into the surfaces or into the interior of the scintillator rods (see U.S. Pat. Application No. 60/667,824). Preferably a substantial fraction of the light coupled into a crossed rod reaches the readout detector for the crossed rod while optical leakage out of the crossed rod into rods it is coupled to results in negligible readout signals in those rods. Controlling the directionality of optical signals between and within cross-coupled rods or cross-coupled rods and fiber arrays will affect the system spatial resolution in addition to energy resolution.

Identical or dissimilar cross-coupled scintillator array modules (as well as cross-coupled fiber and scintillator array modules) can be conveniently butted along one or both reflective ends to form larger detector modules. Butting (possibly with a small gap) these larger modules leads to a spacing that is typically greater than twice the thickness of the readout devices. This can be mitigated by using double-sided optical readout devices (which can also be employed with non-crossed detector modules described in this invention). This double-sided readout device can be comprised of two independent photodetectors sharing common electronics or a single photodetector with two optically-active sides that preferably offer distinct signal outputs to the shared electronics. (For reduced count rates a single signal output may be tolerated based on coincidence with the signal generated from a different scintillator rod or a fiber in the same detector module.) An alternative geometry is to butt (possibly with a small gap) a readout face of one module with the reflective face of another module, ensuring a repeated spacing between modules in a large array of modules.

The technique of covering non-contact walls with reflective materials or WLS materials (optionally different from any WLS material present at the contact surface) and reflective materials can be applied to other scintillator rod (element) geometries such as those shown U.S. Pat. Application No. 60/667,824, FIGS. 1-9. For example, in the case of FIGS. 2F, 2G, and 2H WLS materials can be applied to internal surfaces. In the case of FIGS. 3A-B one implementation that would further reduce costs is to replace the dual readout design with a readout device at only one end and a reflective material (or WLS and reflective material) at the other end of the array. The stripes can be absorptive, reflective, or use WLS materials. As with the case of cross-coupled scintillator rods, an array of focusing lenses such as Fresnel or GRIN lenses, Selfoc lenses, etc. can be positioned at the interface between adjacent scintillator rods (typically adjacent layers of scintillator rods), focusing optical signals onto directional mirrors or WLS-coated directional mirrors located on the opposite surface from the interface.

The technique of using a pattern of stripes consisting of multiple WLS materials can be applied to both coupled shared optical designs (adjacent or crossed rods, crossed fibers) or isolated optical designs. For example, a pattern of WLS stripes of multiple materials (that result in fluorescence of at least one of different colors, pulse shapes (including delay times)) can be applied perpendicular to the lengths of scintillator rods on one or more surfaces. A different stripe pattern can be applied to different rod surfaces providing additional spatial information but possibly adding to readout complexity due to a contribution of output signal from more than a few (maximum) distinct WLS stripes. Various WLS materials can include films and dyes, phosphor particles, quantum dots, etc. Stripes represent a simple pattern but other geometric patterns such as arrays of squares, triangular stripes (perpendicular or parallel to the rod), etc. can be employed. SAR (or DOI) information can be determined with a photodetector readout at one end of the rod. In one implementation reflecting material(s) may be applied at the other end of the rod. In another implementation a dual readout is employed, collecting more-detailed positional information but with an increase in hardware costs. These single and dual readout formats represent designs wherein adjacent rods (a parallel array or stacked parallel array) are optically isolated and structure is provided by the WLS pattern. Additional coupled, light sharing implementations include light sharing with either adjacent or crossed rods (or fiber arrays), again offering the potential for more positional information but with increased cost. Encoding position along the length of a rod represents an approximation to a scintillator capable of a continuously varying pulse shape (including pulse delay) or wavelength shift as a function of position along the length of a rod (a continuous Phoswich scintillator design). Efforts to grow scintillators with a continuous Phoswich capability have met with limited success, in part because many desirable scintillator candidates grow in a needle-like geometry (providing directional light-piping similar to what is achieved with CsI:Na or CsI:Tl). Yields typically decrease as the height of the scintillator needles increases. Height issues limit stopping power at the greater photon energies used in Nuclear Medicine when employed in a face-on geometry. Rotating the scintillator and photodetector readout into an edge-on orientation provides SAR resolution due to the continuous Phoswich capability as well as light piping. Stopping power is no longer an issue. A reflecting material(s) can be applied to the face opposite the edge-on readout surface. DOI is straightforward to determine with the appropriate 2-D edge-on readout detector. Now the stacked layers are defined by the 2-D readout detector rather than by layers of discrete scintillator rods. SAR spatial resolution is defined by continuous Phoswich capability along the height of the scintillator needles. The lengths of the scintillator needles are likely to be shorter than the lengths of conventional scintillator rods that employ WLS encoding. Even if the scintillator can be grown without directionality properties (in which case a rod geometry would be implemented) the yields are still likely to be height-dependent. The structure in the continuous Phoswich scintillator design is integrated into the height-dependent response properties of the scintillator material.

A cross-coupled readout scintillator rod array layer or a cross-coupled fiber (including WLS fiber) optic array need not be limited to coupling with a single scintillator rod array layer (two-component building blocks). Further reductions in the total number of readout elements are possible for combinations of two parallel layers of scintillator rods coupled with either a cross-coupled layer of scintillator rods or a cross-coupled fiber optic array in between the parallel layers of scintillator rod arrays (three-component building blocks). Assume that three or more layers of scintillator rods are required for a specific crossed-rod detector design. For the case of cross-coupled scintillator rods there is a reduction in the total number of readout elements if the detector design requires an odd number of scintillator layers and at least one three-component building block is employed. Now assume that two or more layers of scintillator rods are required for a specific cross-coupled fiber array detector design. Except for the case of three scintillator layers (where two cross-coupled fiber arrays are required) there is a total readout elements advantage in using the cross-coupled fiber three-component building block (for an even number of scintillator layers) or a combination of cross-coupled fiber three-component building blocks with a single two-component building block (for an odd number of scintillator layers). The spatial positioning signal strength for the three-component building block designs may be reduced since reflective coating options for previously uncoupled surfaces may change. Maximum possible count rates will be reduced if the total number of readout elements is reduced. Layers of scintillator rods can use the same or different scintillator materials, preferably with different spectral and/or pulse shape properties. Fiber optic arrays can use no WLS materials, a single WLS material, or multiple WLS materials (in which case WLS color and/or pulse shape can be used to discriminate between the two parallel scintillator layers). Furthermore, it should be noted that if sufficiently large optical signals can be coupled into the optical fiber array then the fiber optic array may be coupled to scintillator rod layers in neighboring detector modules (further reducing readout costs). The fiber optic arrays can span multiple detector modules, even non-contiguous detector modules. Septa (such as cut sheets or coatings of septa materials) can be introduced between the detector elements (for example, scintillator rods) within individual detector layers that are employed in SAR detector designs previously described (typically one layer or multiple parallel layers of scintillator rods) or in cross-coupled layer SAR designs described herein (as well as designs employing parallel layers of scintillator rods with cross-coupled fiber optic arrays). The inclusion of septa imposes a degree of directionality that may influence detector orientation with respect to the radiation (neutral particles such as photons and neutrons as well as charged particles). Another option is to place a layer of a converter material preferably on the entrance surface of a layer of detector elements such as scintillator rods in order to enhance detection efficiency and/or filter the incident radiation. An attenuator material may be used in a similar fashion to a converter material although the function is typically limited to filtration based on energy or particle type. Converter materials (and attenuator materials) can, in general, be placed next to any appropriate detector element surface.

A typical implementation of a SAR detector with parallel layers or cross-coupled layers (or cross-coupled fiber arrays) of scintillator rods (or structured scintillator elements) offers uniform spatial resolution as a function of depth (elements or rods all offer the same spatial resolution for all layers). By varying rod dimensions (or element dimensions) as a function of depth the spatial resolution can be altered as a function of depth. For example, the spatial resolution requirements for a mixed energy or mixed particle radiation field may vary according to energy or particle type. It is straightforward to vary spatial resolution within a layer by varying rod or element dimensions within that layer. For example, providing high resolution near the center and lower resolution near the periphery of a detector module. In general spatial resolution can also be varied between detector modules. Thus spatial resolution and material composition can be varied within individual detector modules and between detector modules as is needed for the particular application in radiation detection. Although a planar layer or layers detector geometry is common, other geometries such as focused shapes are possible. Ring (annular) detector geometries, etc. can also vary spatial resolution and material composition. Designs such as a ring detector may employ parallel layers or cross-coupled layers (or cross-coupled fiber arrays) of scintillator rods (or structured scintillator elements). Cross-coupled fiber arrays are straightforward to implement due to the flexibility of optical fiber.

Detectors based on cross-coupled scintillator rods, fiber arrays cross-coupled with scintillator rods, or sparse photodetector arrays with scintillator rods permit a modular design that can be repeated as often as needed to create large detectors. If limited detector modularity is acceptable, then the thin photodetector readout on at least one side of the stacked array of rods can be replaced with a bulky (thick) photodetector readout (bulky photodetectors create undesirable gaps between neighboring detector modules). For many nuclear medicine imaging applications photoemissive detectors such as PSPMTs would be considered bulky if they created large gaps between preferably adjacent edge-on detector modules. Two, three, or four limited detector modules could be butted together to form a larger detector with shapes such as rings, rectangles, crosses, square, etc. The bulky photoemissive detectors would be positioned on the periphery of the larger detector. For example, four limited, cross-coupled scintillator rod detector modules could be butted on two sides to form a nearly-continuous square detector. The bulky photoemissive detectors on the outside of the square detector would typically require an unacceptably large gap between the square detector and a neighboring square detector. By alternating the scintillator rod module readout sides for the bulky and thin photodetectors an extended rectangular detector can be formed by butting existing scintillator rod limited detector modules along their edges. (This use of existing detector modules may be more cost-effective than building larger readout photodetectors in certain instances.) For some imaging applications this single square detector (or other suitable detector geometry) based on limited detector modules may be sufficient. Other structured SAR detector designs previously described (see "Nelson R, Edge-on SAR Scintillator Device and System For Enhanced SPECT, PET, and Compton Gamma Cameras, U.S. Pat. Application No. 60/667,824. Filing date: Mar. 31, 2006") can be used in place of the cross-coupled configurations described here. It should be noted that in many instances cross-coupled SAR designs can be implemented as cross-coupled DOE designs by a simple change in orientation. For example, this new orientation would permit readout devices to be positioned on the bottom of the detector and along one side. A square or rectangular array of DOE modules could be assembled with no gaps between adjacent detector modules and bulky readout devices could be employed if beneficial.

Although the use of cross-coupled scintillator rods, fiber arrays cross-coupled with scintillator rods, or sparse photodetector arrays with scintillator rods are shown for the case of straight rods (see "Nelson R, Edge-on SAR Scintillator Device and System For Enhanced SPECT, PET, and Compton Gamma Cameras, U.S. Pat. Application No. 60/667,824. Filing date: Mar. 31, 2006"), it should be recognized that similar readout arrangements can be enabled for other scintillator rod shapes, including wedge-shaped and curved scintillator rods. Thus, detector systems with ring, sphere, or other focused shapes can employ the same technology.

The sparse photodetector array design can be combined with focusing optics (as part of the scintillator surface coupled to the surface) such as arrays of Fresnel, GRIN, Selfoc and micro-array lenses, half-lenses, etc. to lower the cost of face-on and edge-on detector designs while ensuring appropriate spatial resolution by reducing the photosensitive area requirements for the photodetector (PDs, APDs, SiPMs, etc.) readout elements. Examples include pixellated scintillator arrays for slit and slot scanning. This concept can be extended from pixellated detectors to edge-on or face-on scintillator block detectors. For example, a face-on scintillator block detector such as an Anger gamma camera could replace the PMTs or PSPMTs with an array of focusing optics and a sparse array of photodetectors, providing two dimensional spatial resolution. The opposite face of the scintillator block could be covered by a reflector material. The reflector material may have a directional nature such as the 3M reflector material.

In general, the SAR encoding methods such as discrete absorptive stripes, off-set segments, internal structures, shared windows, etc. as described in "Nelson R, Edge-on SAR Scintillator Device and System for Enhanced SPECT, PET, and Compton Gamma Cameras, U.S. Pat. Application No. 60/667,824. Filing date: Mar. 31, 2006" can be implemented using WLS materials to aid in encoding patterns. In some instances methods such as forming internal structures can be used with or without WLS materials (including double sided WLS sheets with a reflector in the middle) to emulate offset structures such as the left and right side walls (perpendicular to the readout surface) of FIGS. 5A-B in order to control the flow of optical signals. Furthermore, patterns that utilize one or more WLS materials, such as a 2-D array of pixels, can be applied to the surface of a strip or strip array detector as well as to a block detector in edge-on or face-on orientation to create a 2-D edge-on detectors (with DOI resolution) or a 2-D face-on detector array. Appropriate reflector materials can be applied. In all cases a direct signal and an indirect color signal(s) can be detected. For example, detecting two colors of comparable intensity could indicate that the initial event occurred approximately in between two different WLS material structures (pixels, stripes, etc.). Color detection (discrimination) capability can be incorporated directly into the main readout device (such as a high speed, low noise EMCCD with appropriate color filters applied to select pixels, a SiPM array, a PSPMT, etc.) or by sampling the edge of the scintillator strips or block with additional color-sensitive readout devices. (For example, this format entails readout devices on the front or back as well as the side(s) of a scintillator block.) This concept can be extended to include 3-D detectors where a WLS pattern is applied to one or more surfaces of a scintillator block. Thus thicker scintillator block detectors that offer good spatial resolution (recall Anger gamma camera design approach) can be implemented. Although the WLS color aspect is emphasized here, it is possible to exploit the delay signal aspect of WLS (if the delay is significant) for encoding rather than color. Further encoding can be achieved by using the direct signal, the color signal, and the delay signal. Thus the use of WLS materials with face-on, edge-on, and SAR scintillator geometries can reduce the effects of geometric trapping and self-attenuation and enable color and temporal encoding. The number of scintillator materials and the volumes that can be used for imaging in radiographic slit and slot scanning (as well as nuclear medicine gamma cameras and probes, PET, therapy portal imaging, High Energy Physics and Space Astronomy, and Homeland Security applications such as the detection of contraband, explosives, nuclear materials and radiation threats using x-rays, neutrons, cosmic ray background muons, other charged or neutral particles) will increase.

The choice of detector configuration will be the result of numerous trade-offs: desired spatial resolution and uniformity, energy resolution (energy integrator, photon counter, spectroscopy), scintillator properties, the x-ray energy range, the photodetector readout, the count rate, desired scatter reduction, imaging geometry (slit, simple slot, multi-row slot), and cost.

The slit and slot scanning detector designs described herein have emphasized medical x-ray imaging applications (including radiation therapy portal and CT, conventional CT). Traditional imaging techniques that relied on energy integration can implement photon counting (or even energy resolution) techniques. Implementations of these detectors that use photon counting techniques with energy resolution or suitable threshold settings can also be employed for nuclear medicine imaging (including PET) of gamma ray photons (which are treated in this disclosure as being equivalent to x-ray photons, although different in origin) for patients and small animals. The limited energy resolution capability can be interpreted as depth-of-interaction information, useful for conventional gamma camera imaging, PET imaging, and Compton gamma camera imaging. Focused, parallel, fixed and adjustable pinhole, and coded-aperture collimators used in nuclear medicine can be added to the slit or slot geometries as needed. Scanning with one or more very fine slits in parallel or in a crossed pattern (slits overlap at an angle) can be used for high resolution small animal SPECT and molecular imaging. Corrective algorithms can be employed to compensate for distorted signals and overlapping signals due to the slit geometry. (Note that the edges of the slit gaps may be structured and the gaps are not limited to straight lines.) Edge-on or face-on detectors compatible with the scan geometry can be employed. Scintillator, semiconductor, microchannel plate, gas, etc. radiation detectors (including focused detectors) can be employed. Although a TDI readout mode can be employed, a static readout mode with discrete steps between "snapshots" can also be implemented for slot scan nuclear medicine imaging. Dual-use versions of slit and slot scanners could be implemented for both medical x-ray imaging and nuclear medicine imaging with potential cost savings. Although this invention emphasizes slit and slot detector designs, implementations of these detector designs are not constrained to small surface areas. At additional cost, large area detectors can be implemented permitting slit, slot, and area imaging. In addition, these detectors designs may be used for particle physics, astronomy, industrial, and home land security-related radiation imaging applications (fissile materials, radioactive materials, explosives, etc.) involving photons or particles (charged or neutral). Furthermore, storage scintillation phosphors can be employed (with reduced throughput in some cases) in place of the conventional fluorescent scintillators described previously.

The implementation of SAR detector designs offers an additional advantage for scintillator-based and semiconductor-based detectors with regard to improvements in timing resolution (in addition to potential improvements in energy resolution previously described). If we know the approximate speed of the signal carriers such as optical photons (or electron and holes in the case of semiconductors) then once the position of the event is estimated with respect to the readout elements a timing correction can be estimated for when the initial interaction occurred based on its distance to a readout element divided by the speed of the photons (or electrons and holes). The timing correction is then subtracted from the trigger time initially measured at the readout element (when the detector recognizes that a valid event has occurred). This electronically-determined, temporal correction factor can be used to improve coincident imaging (in particular for semiconductor detectors such as CdZnTe, CdTe, $HgI_2$, etc., with poor timing resolution) and thus would be useful for applications such as PET imaging. This correction is also applicable for electronic DOI (depth-of-interaction) measurements used in PET imaging and other coincidence imaging techniques. Other methods of electronic DOI correction, for example the bi-parametric spectrum technique (Verger L., et al., IEEE Trans. Nucl. Sci., Vol. 51(6), pp. 3111-3117, December 2004), can be used for estimating timing corrections as well as energy corrections for edge-on or face-on detector geometries.

Although detector designs that incorporate cross-coupled scintillator rods, cross-coupled scintillator rods and fiber arrays, gas detectors based on converter straws or converter sheets, and scintillator or semiconductor detectors that incorporate converter materials or septa material, etc. can be used for slit or slot imaging applications it is readily apparent that these detector designs can be extended for use with area imaging applications (planar detectors, ring detectors, etc.). Cross-coupled rod or cross-coupled rod and fiber array designs can be incorporated into Compton gamma camera designs as well as gamma camera and PET camera designs.

LITERATURE REFERENCES EXPRESSLY INCORPORATED BY REFERENCE

Nelson, et al., High Efficiency X-Radiation Converters, U.S. Pat. No. 4,560,882 [Dec. 24, 1985].
Nelson R, X-ray Detector for Radiographic Imaging, U.S. Pat. No. 4,937,453 [Jun. 26, 1990].
Nelson R, (CIP to U.S. Pat. No. 4,937,453), U.S. Pat. No. 5,017,782 [Nov. 19, 1990].
Nelson R, Barbaric Z, Zach R, Apparatus for Narrow Bandwidth and Multiple Energy X-ray Imaging, U.S. Pat. No. 4,958,368 [Sep. 18, 1990].

Nelson R, Barbaric Z, Zach R, (CIP to U.S. Pat. No. 4,958, 368) U.S. Pat. No. 4,969,175 [Nov. 6, 1990].

Nelson R, Method for Manufacturing a High Resolution Structured X-ray Detector, U.S. Pat. No. 5,258,145 [Nov. 2, 1993].

Nelson R, Nelson W, Device and System for Improved Imaging in Nuclear Medicine and Mammography, U.S. Pat. No. 6,583,420 [Jun. 24, 2003].

Nelson R, Zach R, High Resolution Device and Method for Imaging Objects within an Obscuring Medium, U.S. Pat. No. 6,216,540 [Apr. 7, 2001].

Nelson, et al., Device and system for enhanced SPECT, PET, and Compton scatter imaging in nuclear medicine, U.S. Pat. No. 7,291,841 [Nov. 6, 2007].

Nelson R, Slit and Slot Scan Scintillator Devices and Systems for Enhanced Radiographic Imaging, U.S. Patent Office Disclosure Document No. 610914, Jan. 8, 2007.

Nelson R, Edge-on SAR Scintillator Device and System For Enhanced SPECT, PET, and Compton Gamma Cameras, U.S. Pat. Application No. 60/667,824. Filing date: Mar. 31, 2006.

Braem A., et al., Nuc. Instr. Meth. Phys. Res. A Vol. 525, pp. 268-274, 2004.

Braem A., et al., Nuc. Instr. Meth. Phys. Res. A Vol. 580, pp. 1513-1521, 2007.

Verger L., et al., IEEE Trans. Nucl. Sci., Vol. 51(6), pp. 3111-3117, December 2004.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A stacked, cross-coupled array or parallel array or structured scintillator SAR detector, wherein adjacent layers are comprised of the same material or materials that differ in at least one of composition, emission spectra, decay properties.

2. The stacked, cross-coupled array or parallel array or structured scintillator SAR detector of claim 1, wherein spatial resolution is varied either within a layer, as a function of depth, or both.

3. The stacked, cross-coupled array of claim 1, wherein a scintillator array layer is cross-coupled to upper and lower array layers of scintillator SAR detector elements to reduce the total number of readout detector elements.

4. The stacked, cross-coupled array of claim 1, wherein at least one of a low index of refraction material, a WLS material, focusing optics, nanostructures is used to enhance cross-coupling between layers of scintillator SAR detector elements or between layers of fiber arrays and layers of scintillator SAR detector elements in order to improve spatial resolution.

5. The stacked, cross-coupled array of claim 1, wherein at least one of a low index of refraction material, a WLS material, focusing optics, nanostructures is used to enhance coupling between adjacent scintillator detector elements to improve spatial resolution.

6. The stacked, cross-coupled array of claim 1, wherein at least one of a low index of refraction material, a WLS material, a reflective material, a directional reflector, a roughened surface is used to enhance the optical signal that reaches the readout detector coupled to a scintillator rod or a fiber array.

7. The stacked, cross-coupled array of claim 1, wherein the WLS fiber array is cross-coupled to at least one of the upper and lower arrays of scintillator SAR detector elements to improve spatial resolution.

8. The stacked, cross-coupled array of claim 1, wherein a cross-coupled optical fiber or WLS optical fiber array that spans multiple detector modules.

9. The scintillator radiation detector of claim 1, wherein a at least one WLS material or color filter material is applied to at least one surface of a scintillator block, strip, rod, SAR detector element, internal structure, a preferred photodetector pixel that enables at least one of: reduced geometrical optical trapping, reduced optical self-attenuation, improved spectral matching to the photodetector, a time delay, spatial encoding.

10. The stacked, cross-coupled array of claim 1, wherein a sparse photodetector array is coupled to at least one of an upper array, a lower array of scintillator SAR detector elements in place of fiber optics.

11. The sparse photodetector array of claim 10, wherein WLS-appropriate color filters are applied to preferred photodetector elements.

12. The sparse photodetector array of claim 10, wherein the sparse photodetector array is coupled to a scintillator array by focusing optics.

13. The sparse photodetector array of claim 10, wherein the sparse photodetector array is coupled to a scintillator block by focusing optics.

14. The scintillator radiation detector of claim 1, wherein at least one of a converter material, an attenuator material is applied to one or more walls of the scintillator elements in order to improve conversion efficiency or filtration for at least one of: x-rays, gamma rays, charged particles, and, neutral particles.

15. The scintillator detector material of claim 14, wherein a semiconductor or gas detector material is employed in place of the scintillator material.

16. The scintillator-based radiation detector of claim 1, wherein the scintillator material contains a component that acts as at least one of a converter, an attenuator for at least one type of radiation.

17. The scintillator radiation detector of claim 1, wherein a septa material is adjacent to at least one wall of a detector element, reducing cross talk between detector elements for at least one of: x-rays, gamma rays, charged particles, neutral particles.

18. A stacked straw, gas SAR imaging detector for radiation detection, wherein the detector incorporates a thin semi-annulus of a converter material within the upper half of each straw detector fiber.

19. The stacked straw, gas SAR imaging detector of claim 18, wherein the thin semi-annulus of converter material is replaced by a thin external converter coating or sheet on the upper surface of the straw detector fiber.

20. The stacked straw detector of claim 18, wherein alternative detectors such as a scintillator, a semiconductor, an amorphous semiconductor, a microchannel plate amplifier, wire chamber, etc, are employed in place of the straw detectors.

21. The stacked straw, gas SAR imaging detector of claim 18, wherein the straw fibers surrounding the anode wires are replaced by at least one of thin converter sheets, thin absorber sheets and the readout wires are oriented parallel or perpendicular to the sheets.

22. A method for enhancing the resolution of a scintillator rod or array detector by a timing resolution correction, wherein timing resolution is enhanced by: determining the position of the event with respect to the readout elements, dividing the distance of the event from a readout element by the speed of the signal carriers to estimate a timing correction, and subtracting the timing correction from the trigger time initially measured at the readout element.

23. A method for enhancing the resolution of a scintillator rod or array detector by an energy resolution correction, wherein energy resolution is enhanced by: determining the position of the event with respect to the readout elements, determining the positional optical signal loss by numerical or experimental means, and correcting the output signal levels for optical.

24. A method for enhancing the resolution of a scintillator rod or array detector by a crosstalk correction, wherein crosstalk resolution is enhanced by acquiring experimental or Monte Carlo simulation data including: irradiating a single detector element, recording the detected radiation by the detector element and the detected cross talk radiation in near and distant detector elements, repeating this procedure for each detector element as needed, determining the weighted cross talk contributions to each detector element from near and distant detector elements, and correcting the total detected signal for each pixel.

25. A method for enhancing the resolution of a scintillator rod or array detector by an encoding correction, wherein spatial resolution is enhanced by spatial encoding including: the processes of light sharing and/or the application of patterns of WLS films to preferred rod surfaces, and then calibrating, through simulation or measurement of the 1-D or 2-D position-sensitive signal and intensity on at least one output face of the scintillator rod as a function of 3-D interaction location of radiation within the rod, developing a look-up table of at least 1-D and preferably 3-D spatially-encoded information, and comparing measured data during imaging with look-up table data to determine at least improved 1-D SAR or DOI spatial position along the length of the rod and preferably 2-D or 3-D spatial position within the rod.

26. A method for enhancing the resolution of a scintillator rod or array detector by a calibration correction, wherein spatial resolution is enhanced by spatial calibration, through simulation or measurement, including: determining the 1-D or 2-D position-sensitive signal and intensity on at least one output face of the scintillator rod as a function of 3-D interaction location Of radiation within the rod, developing a look-up table of at least 1-D and preferably 3-D spatially-encoded information, and comparing measured data during imaging with look-up table data to determine at least improved 1-D SAR or DOI spatial position along the length of the rod and preferably 2-D or 3-D spatial position within the rod.

* * * * *

UNITED STATES PATENT AND TRADEMARK OFFICE
CERTIFICATE OF CORRECTION

PATENT NO. : 8,017,906 B2  
APPLICATION NO. : 12/384459  
DATED : September 13, 2011  
INVENTOR(S) : Nelson et al.

Page 1 of 1

It is certified that error appears in the above-identified patent and that said Letters Patent is hereby corrected as shown below:

Column 26, line 12 should read: "mented as cross-coupled DOI designs by a simple change in"

Column 26, line 15 should read: "and along one side. A square or rectangluar array of DOI"

Signed and Sealed this

Seventeenth Day of January, 2012

David J. Kappos
*Director of the United States Patent and Trademark Office*